United States Patent
Gamache et al.

(10) Patent No.: US 12,553,867 B2
(45) Date of Patent: Feb. 17, 2026

(54) VARIABLE LOAD CHROMATOGRAPHY VALVE FOR FLUID ANALYSIS

(71) Applicant: MECANIQUE ANALYTIQUE INC., Thetford mines (CA)

(72) Inventors: Yves Gamache, Adstock (CA); Andre Lamontagne, Adstock (CA); Frederic Bedard, Thetford Mines (CA); Andre Cliche, St-Pierre-de-Broughton (CA)

(73) Assignee: MECANIQUE ANALYTIQUE INC. (CA)

(*) Notice: Subject to any disclaimer, the term of this patent is extended or adjusted under 35 U.S.C. 154(b) by 349 days.

(21) Appl. No.: 18/266,705

(22) PCT Filed: Dec. 9, 2021

(86) PCT No.: PCT/CA2021/051772
§ 371 (c)(1),
(2) Date: Jun. 12, 2023

(87) PCT Pub. No.: WO2022/126246
PCT Pub. Date: Jun. 23, 2022

(65) Prior Publication Data
US 2024/0044848 A1    Feb. 8, 2024

Related U.S. Application Data

(60) Provisional application No. 63/125,474, filed on Dec. 15, 2020.

(51) Int. Cl.
*G01N 30/20* (2006.01)
(52) U.S. Cl.
CPC ....... *G01N 30/20* (2013.01); *G01N 2030/201* (2013.01); *G01N 2030/202* (2013.01)

(58) Field of Classification Search
CPC ............. G01N 30/20; G01N 2030/201; G01N 2030/202; G01N 30/24; F16K 2200/304; F16K 3/18; F16K 11/0743; F16K 3/16
USPC ....... 73/23.41, 23.42, 61.56, 863.72, 863.73, 73/864.83, 864.84; 251/164, 176, 180; 422/537, 539
See application file for complete search history.

(56) References Cited

U.S. PATENT DOCUMENTS

| | | | |
|---|---|---|---|
| 2014/0191146 A1 | 7/2014 | Moeller et al. | ........... F16K 5/00 |
| 2015/0198255 A1 | 7/2015 | Gamache | ................... F16K 3/18 |
| 2020/0284768 A1 | 9/2020 | Stearns et al. | ......... G01N 30/20 |

FOREIGN PATENT DOCUMENTS

| | | | | |
|---|---|---|---|---|
| WO | WO 2019/168691 | 9/2019 | ............. | F16K 99/00 |
| WO | WO 2019/227231 | 12/2019 | ............. | G01N 30/20 |

*Primary Examiner* — Robert R Raevis
(74) *Attorney, Agent, or Firm* — HAYES SOLOWAY P.C.

(57) ABSTRACT

A chromatography valve for use in fluid analysis and chromatography applications is provided. The valve includes a first body having passages extending therethrough and opening on a flat face of the first body at respective passage ports. The valve also includes a second body engaged with the first body in a sealed relationship, whereby one of the first and second bodies is movable relative to the other one between two or more positions for controlling fluid circulation through the passages. The second body includes at least one cartridge receiving cavity for receiving at least one cartridge removably provided therein. The cartridge has channel(s) for channeling fluid of pairs of the passage ports, depending on the position of the first body relative to the second body, thereby channeling fluid through selected ones of the passages via the at least one channel. A method of operating the valve is also provided.

24 Claims, 18 Drawing Sheets

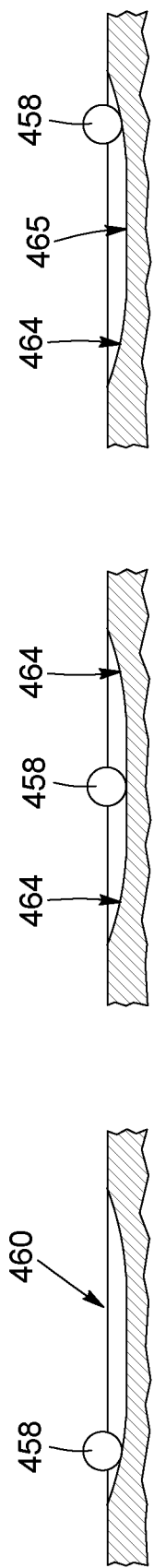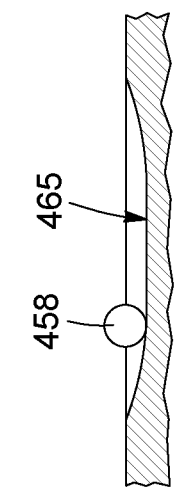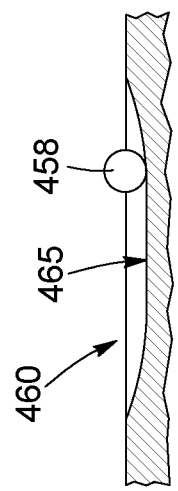

VARIABLE LOAD CHROMATOGRAPHY VALVE FOR FLUID ANALYSIS

TECHNICAL FIELD

The technical field generally concerns systems and methods related to chromatography valves, and more particularly to a variable load chromatography valve.

BACKGROUND

Chromatographic valves exist in various types and configurations. Each of them has specific characteristics which make them more or less suitable for certain types of applications.

Rotary valves are more common as they can cover a very broad set of applications and are less expensive. They are the preferred choice at high temperatures since they do not suffer from flow derating like in typical GC-diaphragm valves. In a diaphragm valve, the diaphragm may lose its shape depending on the temperature at which the valve is operated. In contrast, rotary valves are typically made of a single, integral part, which keeps its shape regardless of temperature operating conditions. That said, rotary valves are more subject to wear, due to high friction forces between the rotor and stator surfaces. The lifetime of rotary valves is highly dependent on the material of the parts used in their construction. As is known in chromatography, different materials are required to respect chemical compatibility between the samples being analyzed and the valve material. The material used for the valves components is typically dictated more by the application for which the valve is being used, than material durability. The stator and rotor interfaces in rotary valves are also difficult to seal properly. The seal can be achieved by matching the rotor and stator's conical surfaces. Given the difficulty of properly machining two identical conical surfaces, high pressure is applied to the rotor's and stator's contact surfaces, to press them against each other, so as to limit as much as possible leaks at the interface of the two parts. Applying this extra force results in more friction between the parts when actuating the valve, which reduces the life span of the valve. It is also not uncommon for a rotor to break over time due to this increased pressing force. This phenomenon is exacerbated at higher temperatures.

To solve issues related to rotary valves, diaphragm valves have been introduced. Diaphragm valves have a longer lifespan and provide better sealing performances, which is often required in critical applications such as UHP (Ultra High Purity) electronic gas analysis. In such diaphragm valves, communication between ports is blocked or allowed by pushing or retracting plungers on/from the diaphragm, which is typically made of a soft material such as plastic, Kapton, polyimide or any appropriate material. In order to achieve a good seal, plungers must be machined with very high precision and must have exceptional surface finish, relative to the diaphragm. The surface against which the plunger is pushed must be smooth and scratch free, to avoid damaging the diaphragm. Contrary to a rotary valve, obtaining a good surface finish on a flat surface is easier compared to a conical surface. One of the challenges with diaphragm valves is the adequate selection of the diaphragm material. It must be smooth enough to offer good sealing properties but hard enough to spring back when the plungers retract from it. Moreover, the diaphragm must maintain its shape and stiffness, regardless of the operating temperature of the valve. Since there is no perfect material, the diaphragm material must be selected amongst a large variety of compositions, so as to cover the broadest temperature spectrum possible. Given that chemical compatibility of the diaphragm relative to the samples under analysis must also be taken into account, in addition to operating temperature, the selection of the proper diaphragm composition becomes quite complex. And regardless of material selection, diaphragms all suffer from temperature flow degradation over time, which is an issue for most applications.

Slide valves (also referred to as sliding valves) are also available for chromatographic applications. However, due to their design, they suffer from poor leak integrity and lifespan issues. With this type of valve, the seal is achieved by applying a pressing force to a part which is sandwiched between two other parts: the middle part and the sliding part. As the pressing force remains constant during actuation of the valve, sliding valves suffer from wear, resulting from the friction between fixed and moving parts. The surface area to be sealed is large, and it is difficult to machine wide areas with an even, smooth surface, and consequently the pressing force needed to properly seal two wide surfaces one against the other is high. Increasing the pressing/sealing force results in more scratches on the contact surfaces, which reduces the sealing integrity over time, and consequently reduces the lifespan of the sliding valves.

In light of the above, there is a need for an improved valve for reducing wear and friction during sliding or rotation of a valve used for chromatography and gas analysis applications.

SUMMARY

According to a first aspect, there is provided a chromatography valve for use in fluid analysis and chromatography applications. The chromatography valve includes a valve cap provided with a plurality of process conduits extending therethrough, the valve cap has a cap interface, and each one of the process conduits includes a process port opening on the cap interface. The valve assembly also includes a valve body engageable with the valve cap and provided with a body interface adapted to face the cap interface, the valve body has an internal chamber provided with an opening defined in the body interface. The valve assembly further includes a valve element provided in the opening of the valve body and having a valve element interface adapted to engage the cap interface, the valve element includes at least one channel adapted to establish fluid communication between a pair of process conduits to enable fluid flow through selected ones of the process conduits via the at least one channel. The vale assembly also includes an actuation assembly provided within the internal chamber of the valve body, the actuation assembly has a rotation mechanism operable to rotate the valve element between two or more operational positions for controlling fluid circulation between the process conduits; and a load varying mechanism adapted to apply a sealing load force on the valve element such that the valve element interface engages the cap interface, the load varying mechanism being adapted to cooperate with the rotation mechanism to selectively reduce and increase the sealing load force via operation of the rotation mechanism.

According to a possible embodiment, the rotation mechanism includes a rotor arm adapted to be rotated, and a rotor head operatively connected to the rotor arm, the rotor head has a valve element receiving cavity configured to house the valve element, and wherein rotation of the rotor arm correspondingly rotates the rotor head and the valve element.

According to a possible embodiment, the load varying mechanism includes a biasing assembly operatively engaged with the rotor head, the biasing assembly being operable to adjust a range of sealing load forces applicable to the rotor head via operation of the rotation mechanism.

According to a possible embodiment, the biasing assembly includes an inner biasing element operable to selectively adjust a minimum value of the range of sealing load forces.

According to a possible embodiment, the inner biasing element includes an inner stack of Belleville washers engaging the rotor head from below and an inner screw connector engaging the inner stack of Belleville washers for applying a pressure thereon, and wherein operating the inner screw connector selectively adjusts the pressure applied to the inner stack of Belleville washers.

According to a possible embodiment, the inner biasing element includes a cylindrical thrust roller bearing provided between the inner stack of Belleville washers and the inner screw connector.

According to a possible embodiment, the biasing assembly includes an outer biasing element operable to selectively adjust a maximum value of the range of sealing load forces.

According to a possible embodiment, the outer biasing element comprises an outer stack of Belleville washers engaging the rotor head from below and an outer screw connector engaging the outer stack of Belleville washers for applying a pressure thereon, and wherein operating the outer screw connector selectively adjusts the pressure applied to the outer stack of Belleville washers.

According to a possible embodiment, the inner biasing element and the outer biasing element are independently operable relative to one another.

According to a possible embodiment, load varying mechanism further comprises a load variator which dynamically adjusts the sealing load force applied to the rotor head during rotation thereof.

According to a possible embodiment, the load variator comprises one or more grooves defined in a disk or an annular plate provided underneath the rotor head, one or more ball bearings slots provided in a bottom surface of the rotor head, and one or more ball bearings provided in respective ball bearings slots, each ball bearing being adapted to roll along the corresponding groove during rotation of the rotor, wherein the one or more grooves have a varying depth causing the ball bearings to apply a varying load on the valve element, by varying the compressing force applied to the rotor head.

According to a possible embodiment, each groove has a levelled region and a pair of sloped regions on either sides of the levelled region, the sloped regions varying the depth of the grooves.

According to a possible embodiment, the rotor head comprises a first portion provided with the valve element receiving cavity, a second portion interfacing with the load varying mechanism and a transition portion adapted to link the first portion to the second portion, the bottom portion being connected to the rotor arm, the first portion being adapted to at least partially rotate, over an angular displacement, independently with respect to the second portion to adjust the sealing load force without rotating the valve element.

According to a possible embodiment, the first portion is a top portion and the second portion is a bottom portion, the transition portion comprises alignment pins extending therethrough and engaging the top and bottom portions such that rotation of the bottom portion engages the top portion in rotation.

According to a possible embodiment, the bottom portion comprises a driving mechanism configured to allow a greater range of motion to the bottom portion relative to the top portion such that the bottom portion can engage the load variator while the top portion remains static.

According to a possible embodiment, the transition portion comprises transition slots shaped and sized to receive a corresponding one of the alignment pins, wherein the alignment pins are adapted to move along the transition slots during rotation of the bottom portion and of the top portion, and wherein the alignment pins are adapted to abut against an extremity of their respective transition slot to prevent further rotation of the top portion.

According to a possible embodiment, the driving mechanism comprises resilient elements housed within the bottom portion, the alignment pins being adapted to engage the resilient elements, and wherein further rotation of the bottom portion when the alignment pins abut against the extremity of their respective transition slot compresses and/or stretches the resilient elements.

According to a second aspect, there is provided a chromatography valve for use in fluid analysis and chromatography applications. The chromatography valve includes a valve cap provided with a plurality of process conduits extending therethrough, the valve cap having a cap interface, and each one of the process conduits comprising a process port opening on the cap interface; a valve body engageable with the valve cap and having a body interface adapted to face the cap interface, the valve body comprising an internal chamber provided with an opening defined in the body interface; a valve element provided in the opening of the valve body and adapted to engage the cap interface, each valve element comprising at least one channel adapted to establish fluid communication between a pair of process conduits to enable fluid flow through selected ones of the process conduits via the at least one channel; and an actuation assembly provided within the internal chamber of the valve body. The actuation assembly includes a rotation mechanism operable to rotate the valve element between two or more operational positions for controlling fluid circulation between the process conduits; and a load varying mechanism adapted to apply a first sealing load force on the valve element when in the operational positions, and a second sealing load force when rotating the valve element via the rotation mechanism, the load varying mechanism comprising a biasing assembly configured to selectively adjust the first sealing load force and the second sealing load force independently from one another.

According to a possible embodiment, the biasing assembly comprises a first biasing element operable to selectively adjust the first sealing load force, corresponding to a minimum sealing load force, and a second biasing element operable to selectively adjust the second sealing load force corresponding to a maximum value of the sealing load force.

According to a possible embodiment, the actuation assembly comprises a rotor head operatively connected to a rotor arm. The rotor head includes a top portion provided with a valve element receiving cavity; a bottom portion interfacing with the load varying mechanism; and a transition portion adapted to link the top portion to the bottom portion, the bottom portion being connected to the rotor arm, the top portion being adapted to at least partially rotate, over an angular displacement, independently with respect to the bottom portion to adjust the sealing load force without rotating the valve element.

According to a possible embodiment, the load variation mechanism comprises one or more grooves defined in a disk or an annular plate provided underneath the rotor head, one or more ball bearings slots provided in a bottom surface of the rotor head, and one or more ball bearings provided in respective ball bearings slots, each ball bearing being adapted to roll along the corresponding groove during rotation of the rotor, wherein the one or more grooves have a varying depth causing the ball bearings to apply a varying load on the valve element, by varying the compression forces applied to the rotor head.

According to a possible embodiment, the transition portion comprises alignment pins extending therethrough and engaging the top and bottom portions such that rotation of the bottom portion engages the top portion in rotation.

According to a possible embodiment, the transition portion comprises transition slots shaped and sized to receive a corresponding one of the alignment pins, wherein the alignment pins are adapted to move along the transition slots during rotation of the bottom portion and of the top portion, and wherein the alignment pins are adapted to abut against an extremity of their respective transition slot to prevent further rotation of the top portion.

According to a possible embodiment, the bottom portion comprises a driving mechanism configured to allow a greater range of motion to the bottom portion relative to the top portion such that the bottom portion can engage the load variation mechanism while the top portion remains static.

According to a possible embodiment, the driving mechanism comprises resilient elements housed within the bottom portion, the alignment pins being adapted to engage the resilient elements, and wherein further rotation of the bottom portion when the alignment pins abut against the extremity of their respective transition slot compresses and/or stretches the resilient elements.

According to a possible embodiment, the valve element comprises a receiving cavity shaped and sized to receive a removable cartridge comprising the at least one channel, rotation of the cartridge being initiated via rotation of the top portion of the rotor head.

According to a possible embodiment, the at least one channel is surrounded by an annular lip protruding from a cartridge interface, the annular lip is engaging the cap interface and surrounding the process ports when in an operational position.

According to a possible embodiment, the cartridge comprises at least one purge channel radially extending on the cartridge interface.

Other features of advantages of the present invention will be better understood upon reading example embodiments thereof, with reference to the appended drawings. While the invention will be described in conjunction with example embodiments, it will be understood that it is not intended to limit the scope of the invention to such embodiments. On the contrary, it is intended to cover all alternatives, modifications and equivalents as defined in the present application.

BRIEF DESCRIPTION OF THE DRAWINGS

FIG. 3A is an enlarged view of a portion of FIG. 3, showing process ports of the valve cap.

FIGS. 12A to 12E are enlarged fragmentary views of components of the load variator, comprising an uppermost washer and a ball bearing moving along a groove, to apply the varying load, according to a possible embodiment.

FIGS. 17A to 17E are top plan views of another embodiment of the bottom portion of the rotor head of FIGS. 11A to 11E.

DETAILED DESCRIPTION

Figure 1:
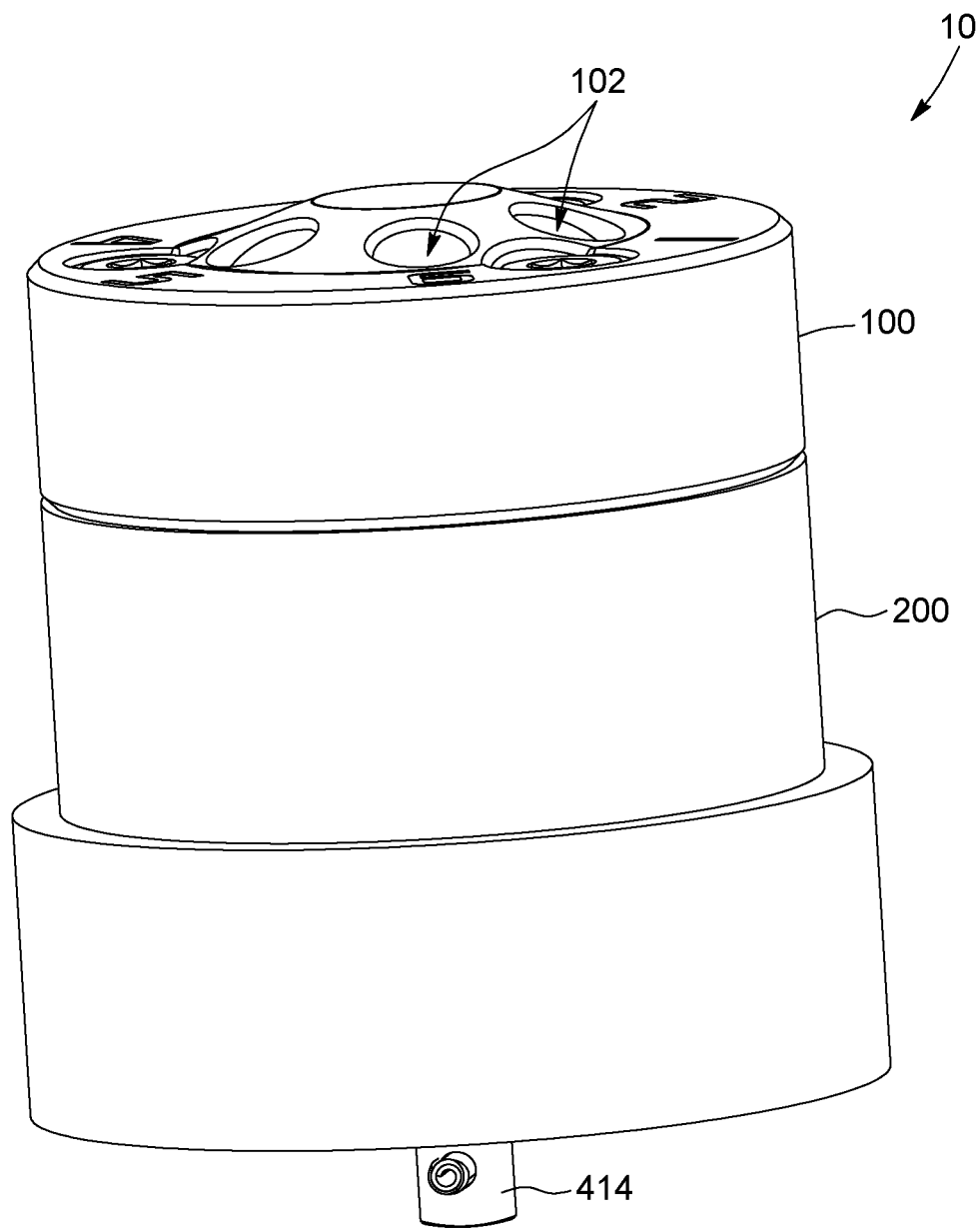
FIG. 1 is a side perspective view of a rotary valve, according to a possible embodiment.
Figure 2:
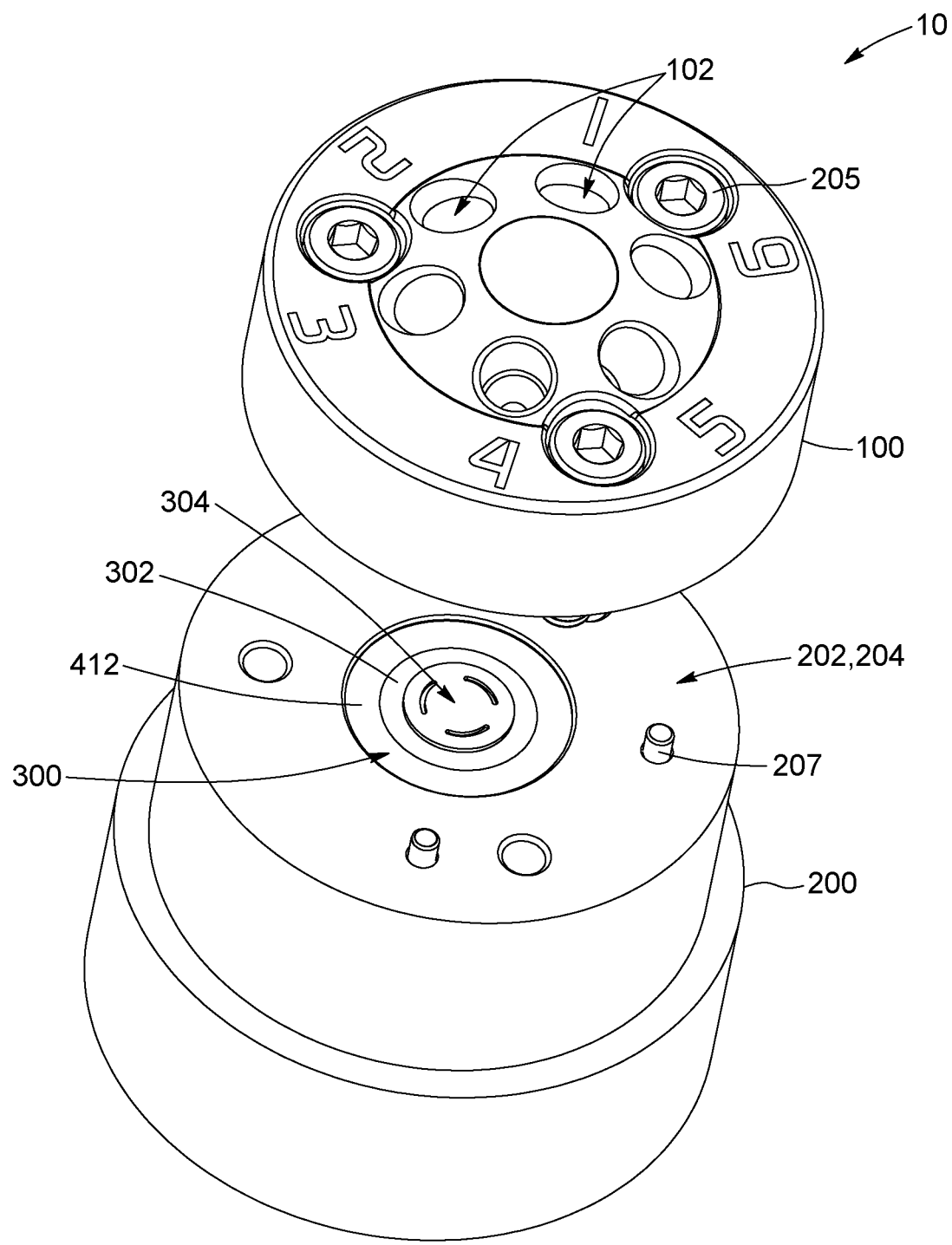
FIG. 2 is a top perspective and partially exploded view of the rotary valve of FIG. 1.

The present invention relates to a valve, and more specifically to a chromatography valve and its associated operating method. The chromatography valve according to the present invention can also be referred to as a "rotary valve". The chromatography valve includes many improvements, each of which can be implemented in the valve, independently from one another, or in combination. For example, the valve can include an improved rotation mechanism configured to reduce stress and wear (e.g., due to friction) during rotation of one or more valve elements, thereby increasing the efficiency and lifespan of the valve and its components. The rotation mechanism can be adapted to enable selectively applying a load between various elements of the valve to create a sealing load force between these elements and reducing said sealing load force when needed. The invention will be better understood with the description of possible embodiments of the valve.

While the different embodiments of the valve described below are a cylindrical rotary slide valve, it should be noted that other types of sliding/movable valves are also possible, such as conical and sliding valves for example. Moreover, the embodiments of the valve described herein can be used in relation with fluids, such as gas and liquid applications, for example.

Referring broadly to FIGS. 1 to 6, a first embodiment of a valve 10 is provided. The embodiment of the valve illustrated is of the HPLC (High Performance Liquid Chromatography) type, but it will be understood that the feature described below can be integrated in other types of chromatography valves. The valve 10 includes a valve cap 100 provided with a plurality of process conduits 102, a valve body 200 engageable with the valve cap 100, at least one valve element 300 positioned at least partially within the valve body 200, and an actuation assembly 400 operatively connected to the valve element 300 for displacing the valve element 300 between two or more operational positions and for selectively applying a load on the valve element 300 for engaging the valve element 300 with the valve cap 100 when in one of the operational positions. In the context of the present disclosure, it should be understood that the expression "valve element" refers to a movable element of the valve 10 which blocks or permits fluid to flow through the different process conduits 102 of the valve cap 100.

It is appreciated that other components can be provided in and/or with the valve such as various fixings and fasteners (e.g., screws, nails, bolts, nuts, washers, springs, etc.) along with sealing elements (e.g., O-rings, etc.), among others. For example, the valve cap 100 and valve body 200 can be connected to each other using one or more fasteners 205 and dowel pins 207, although it is appreciated that other configurations and/or connection tools are possible and could be used. As will be described in relation with various embodiments, some of the components of the valve 10 are generally cylindrical in shape, such as the valve cap 100, valve body 200 and valve element 300, for example, and among others.

Still referring to FIGS. 1 to 6, the plurality of process conduits 102 extend through a thickness of the valve cap 100, and respectively end in a process port 104. The valve cap 100 further includes a cap interface 106 adapted to face the valve body 200 and on which the process ports 104 open. It is appreciated that, depending on the application of the valve 10, the valve cap 100 can be provided with any suitable number of process conduits 102 arranged in any suitable configuration. For example, in this embodiment, the valve cap 100 includes six process conduits 102 arranged in a circle such that the process ports 104 are correspondingly arranged in a circle on the cap interface 106. In other embodiments, the valve cap 100 can be provided with four, eight, ten, twelve or any other suitable number of process ports 104, and arranged in any suitable 2D or 3D configuration (e.g., in a circle, in a square, etc.).

Figure 3:
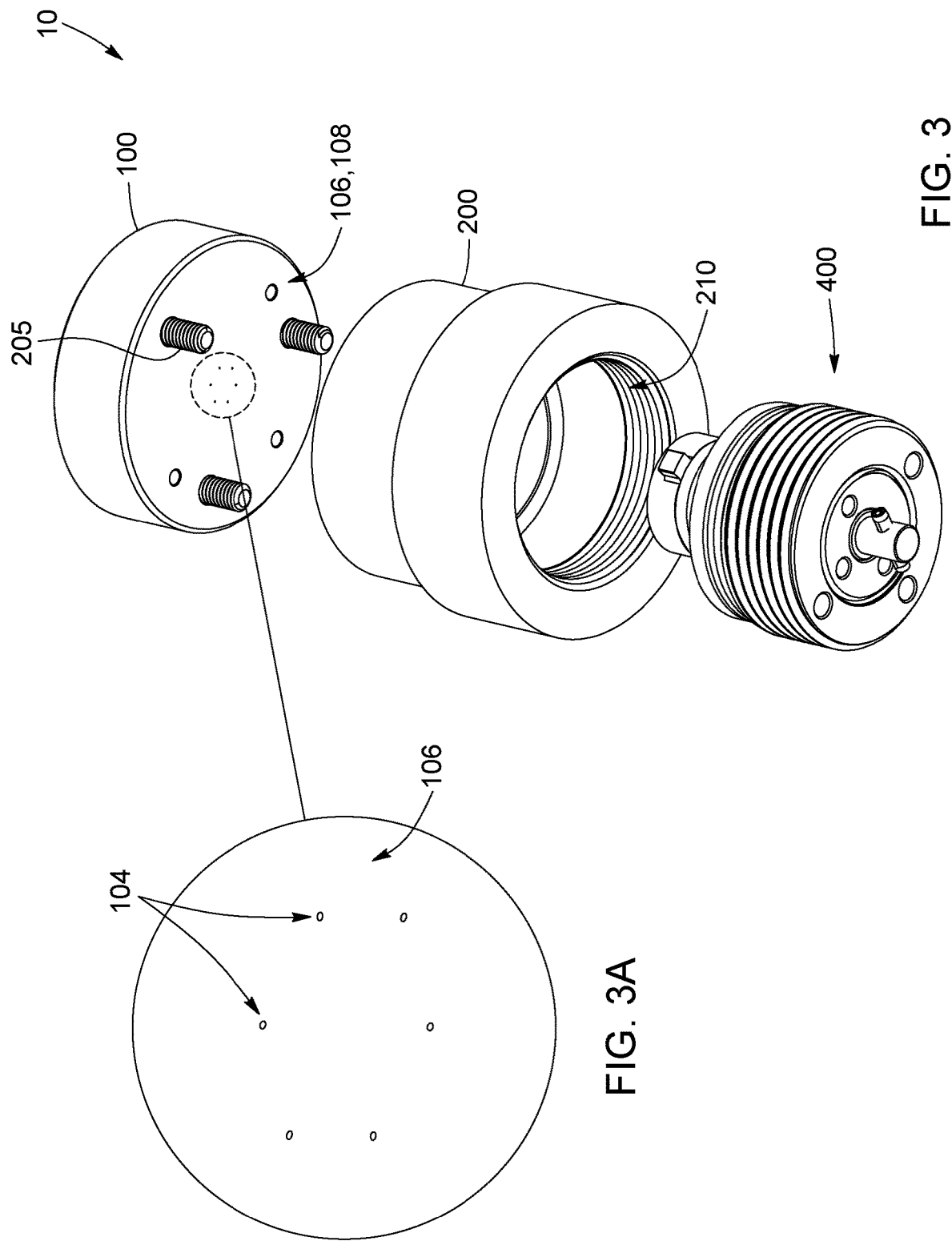
FIG. 3 is a bottom perspective and exploded view of some of the components of the rotary valve of FIG. 1.
Figure 4:
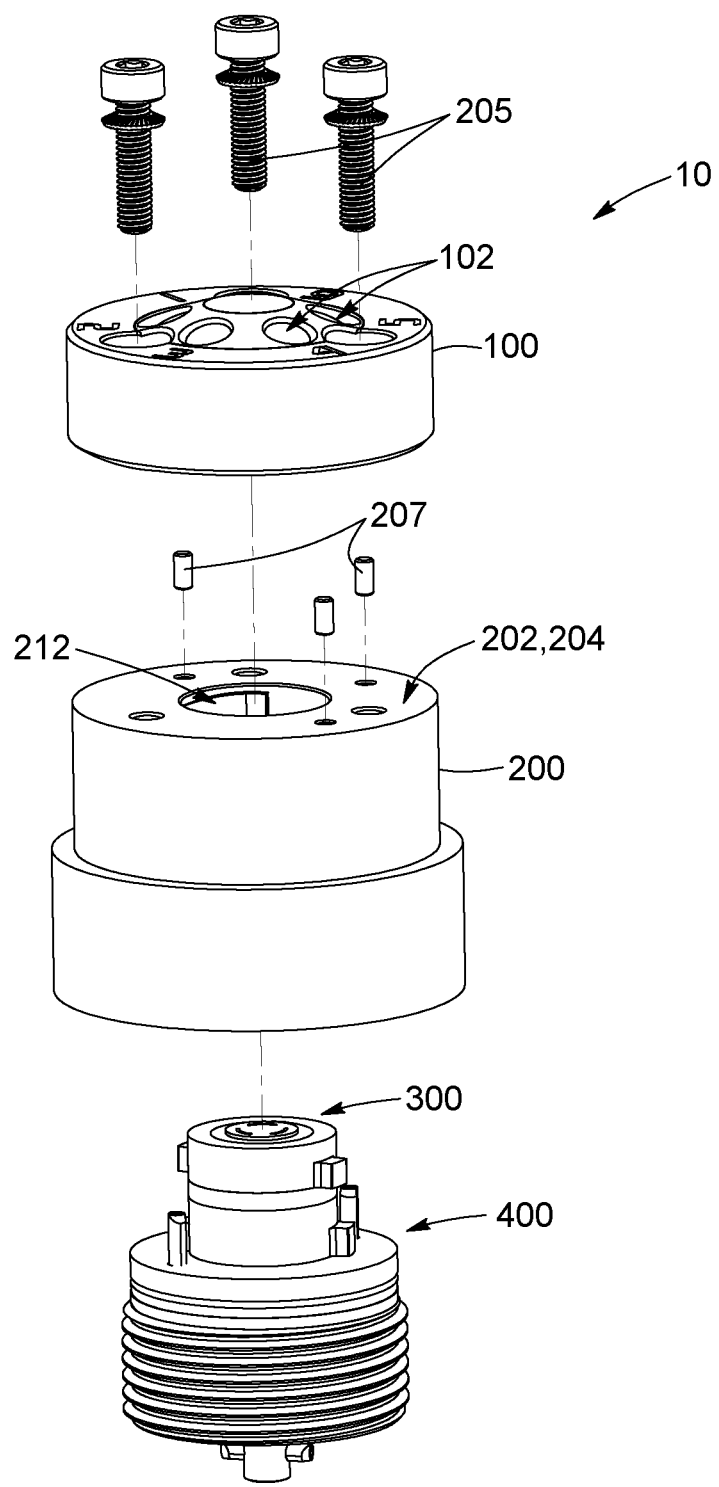
FIG. 4 is a perspective and exploded view of some of the components of the rotary valve of FIG. 1.

In this embodiment, the valve body 200 has a body interface 202 adapted to face the valve cap 100 such that when the valve 10 is assembled, the cap interface 106 engages (e.g., is in contact with) the body interface 202. In this embodiment, the cap interface 106 has a substantially flat surface 108, and the body interface 202 also has a substantially flat surface 204 such that both surfaces 108, 204 can be in a flat contact configuration. As seen in FIGS. 3 and 4, the valve body 200 can be at least partially hollow, and includes an internal chamber 210 shaped and sized for receiving at least one of the valve elements 300 and actuation assembly 400. In this embodiment, the valve body 200 includes an opening 212 defined in the flat surface 204 of the body interface 202 and opening into the internal chamber 210. The opening 212 can be shaped and sized to receive the valve element 300 therein. It is noted that the valve cap 100 and valve body 200 are stationary components of the valve 10, and the valve element 300 and actuation assembly 400 are movable components of the valve 10.

Referring more specifically to FIGS. 2, 4, 5 and 6, in this embodiment, the valve element 300 can include a cartridge 302 adapted to be received within the opening 212 of the valve body 200. The cartridge 302 has a cartridge interface 304 adapted to face and engage the cap interface 106 during operation of the valve 10. More specifically, the cartridge interface 304 has a substantially flat surface and is generally planar with the body interface 202 to engage the cap interface. As will be further described below, the cartridge 302 cooperates with the valve cap 100 and is movable between different positions so as to permit (or obstruct) communication between the process conduits 102. It should also be noted that, during operation of the valve, the cartridge interface 304 and cap interface 106 are in sealing contact with one another to prevent loss of fluids (e.g., leaks) when fluids are flowing from one process conduit 102 to another.

Figure 5:
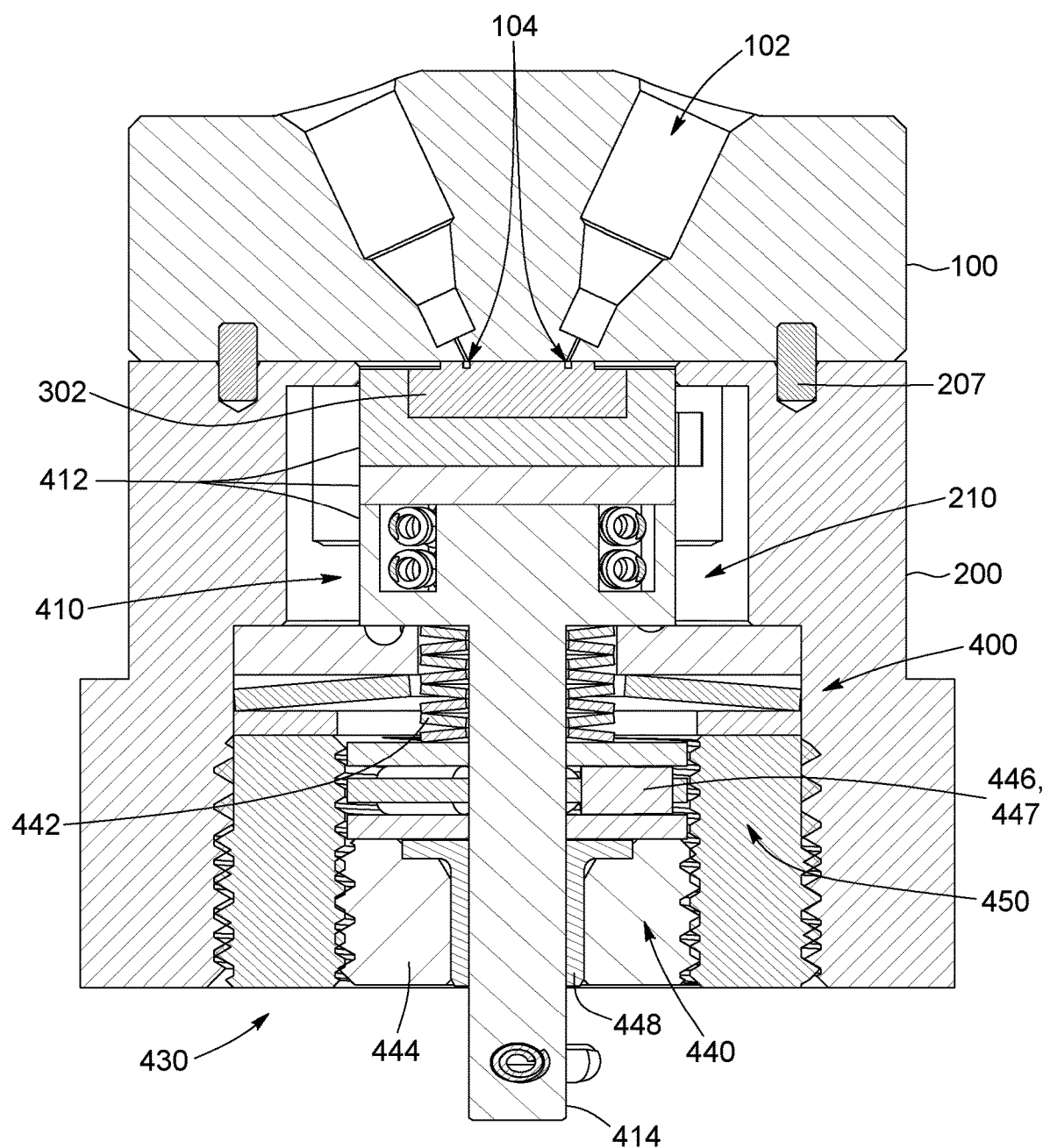
FIG. 5 is a cross-section view of the rotary valve of FIG. 1, showing process conduits extending through the valve cap.
Figure 6:
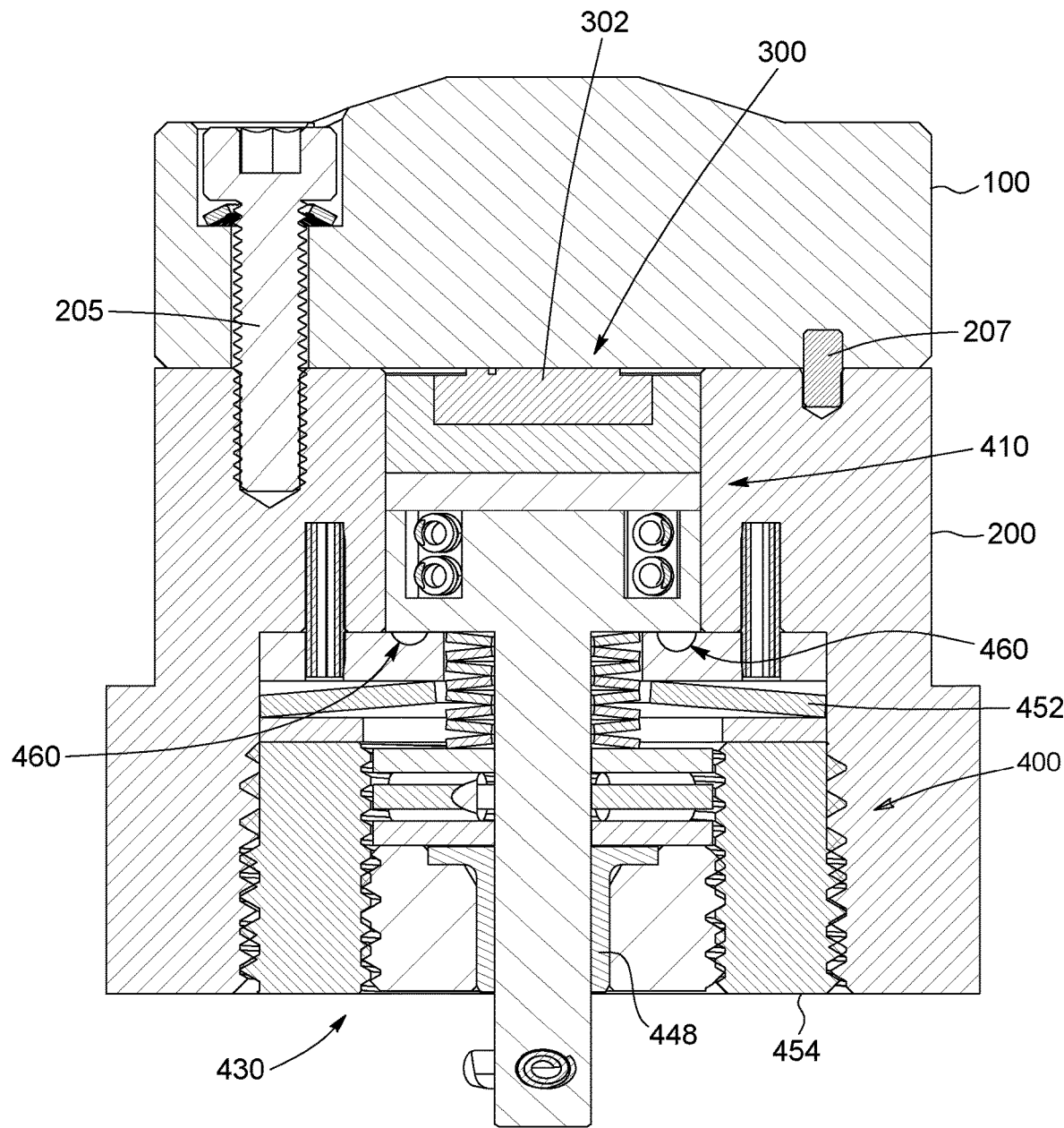
FIG. 6 is a cross-section view of the rotary valve of FIG. 1, showing fasteners and dowel pins connecting the valve cap and the valve body together.
Figure 7:
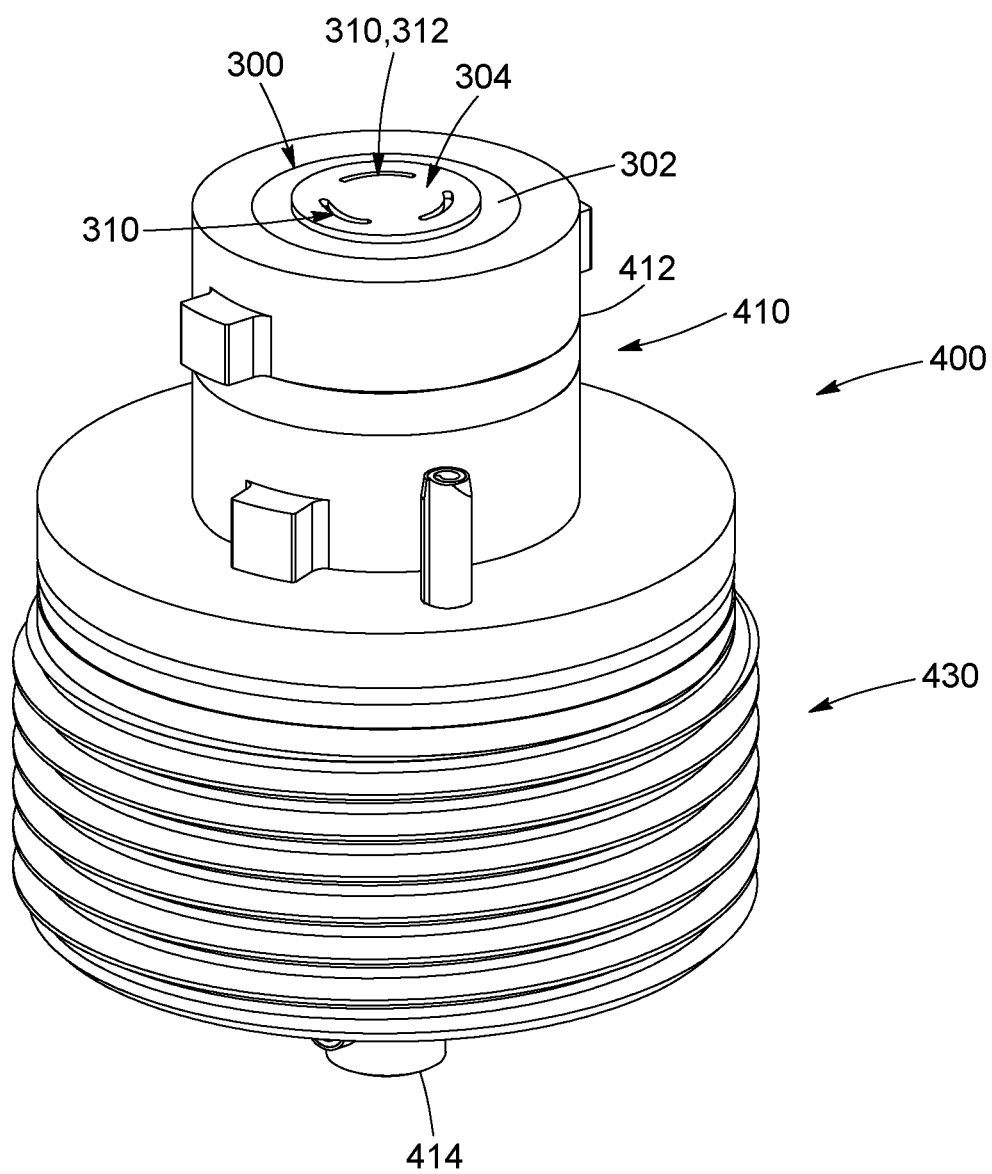
FIG. 7 is a side perspective view of an actuation assembly of the valve of FIG. 1.

With reference to FIG. 7, in addition to FIGS. 2 to 6, the cartridge 302 includes one or more channel(s) 310 shaped, sized and configured for establishing fluid communication between process conduits 102 of the valve cap 100 when the valve element 300 is in an operational position. In this embodiment, the channel 310 includes a recess 312 defined on the cartridge interface 304, e.g., defined on the flat surface of the cartridge 302. The recess 312 can be shaped to enable fluid communication between two process conduits. For example, in the illustrated embodiments, the recess 312 is curved along the cartridge interface 304 to follow the circular configuration of the process ports 104 on the cap interface 106. In addition, it is appreciated that recesses 312 of different volumes can be used in the same cartridge 302. In alternative embodiments, the channel 310 can include a pair of channel ports (not shown) defined on the cartridge interface 304 and connected via a passage extending into a thickness of the cartridge 302. In such embodiments, the process conduits of the valve can be fluidly connected by aligning corresponding process ports with the channel ports of the cartridge. It is noted that other embodiments are possible for fluidly connecting two process conduits together using the valve element 300, and that the channels 310 illustrated in the accompanying figures are exemplary only.

Figure 18:
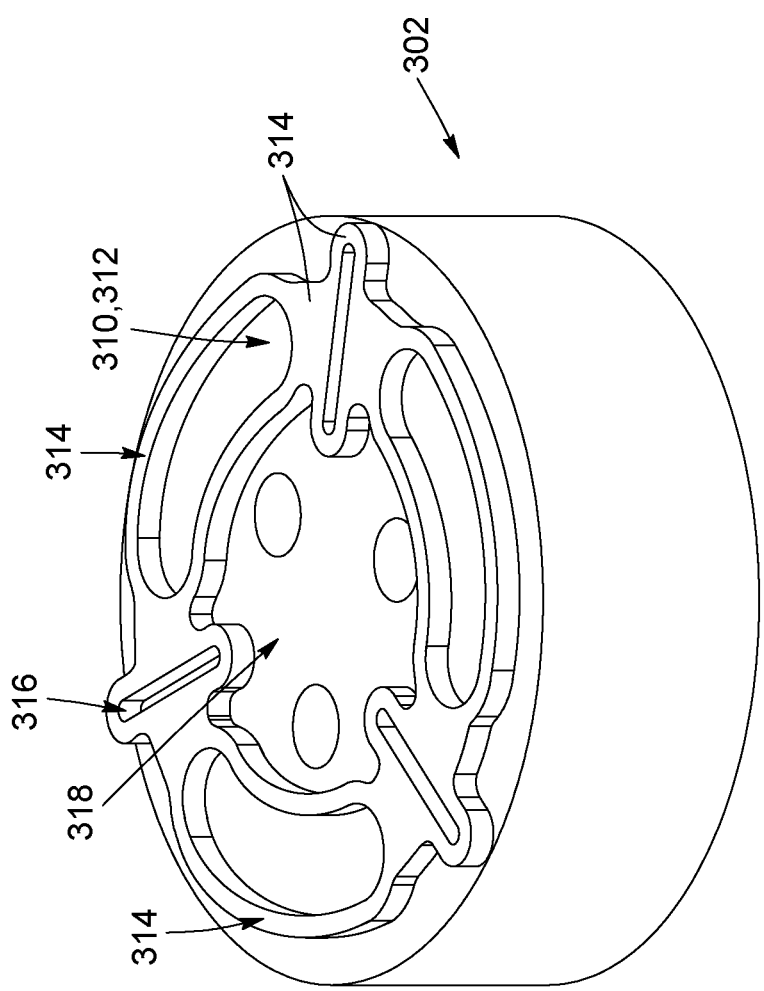
FIG. 18 is a perspective view of another embodiment of the cartridge, showing an annular lip protruding or extending on the cartridge interface.

In another alternative embodiment of a cartridge 302, and with reference to FIG. 18, the channels 310 can be surrounded by an annular lip 314 which protrudes or extends from the cartridge interface 304. In use, the annular lip 314 is adapted to engage the cap interface and surround one of the process ports when in an operational position. Moreover, the cartridge 302 can include purge channels 316 radially extending between adjacent channels 310 (e.g., recesses 312). In the present embodiment, additional annular lips 310 can surround the purge channels 316 which connect with the annular lips 310 surrounding the recesses 312. The purge channels 316 can be adapted to fluidly connect an inner or center section 318 of the cartridge 302 with a surrounding or outer environment when the cartridge 302 is engaged with the cap interface.

In this embodiment, the channels 310 of the cartridge 302 are adapted to establish fluid communication between selected ones of the process conduits 102 when the valve is in an operational position. In some embodiments, the valve can be moved between two or more operational positions, each position putting different channels 310 in fluid communication with different process conduits 102. In the exemplary valve shown in FIGS. 1 to 7, the valve cap 100 includes six process ports 104 (FIG. 3A), and the valve element 300 includes three channels 310 provided in the cartridge 302. However, the cartridge 302 can include any suitable number of channels/recesses 310,312. It should be noted that, in the illustrated embodiments, the shape and size of the channels 310 are configured to establish fluid communication between two adjacent process conduits 102, although it is appreciated that other configurations are possible. For example, two or more channels 310 can be adapted to communicate with one another such that non-adjacent conduits 102 can be fluidly connected.

Figure 8:
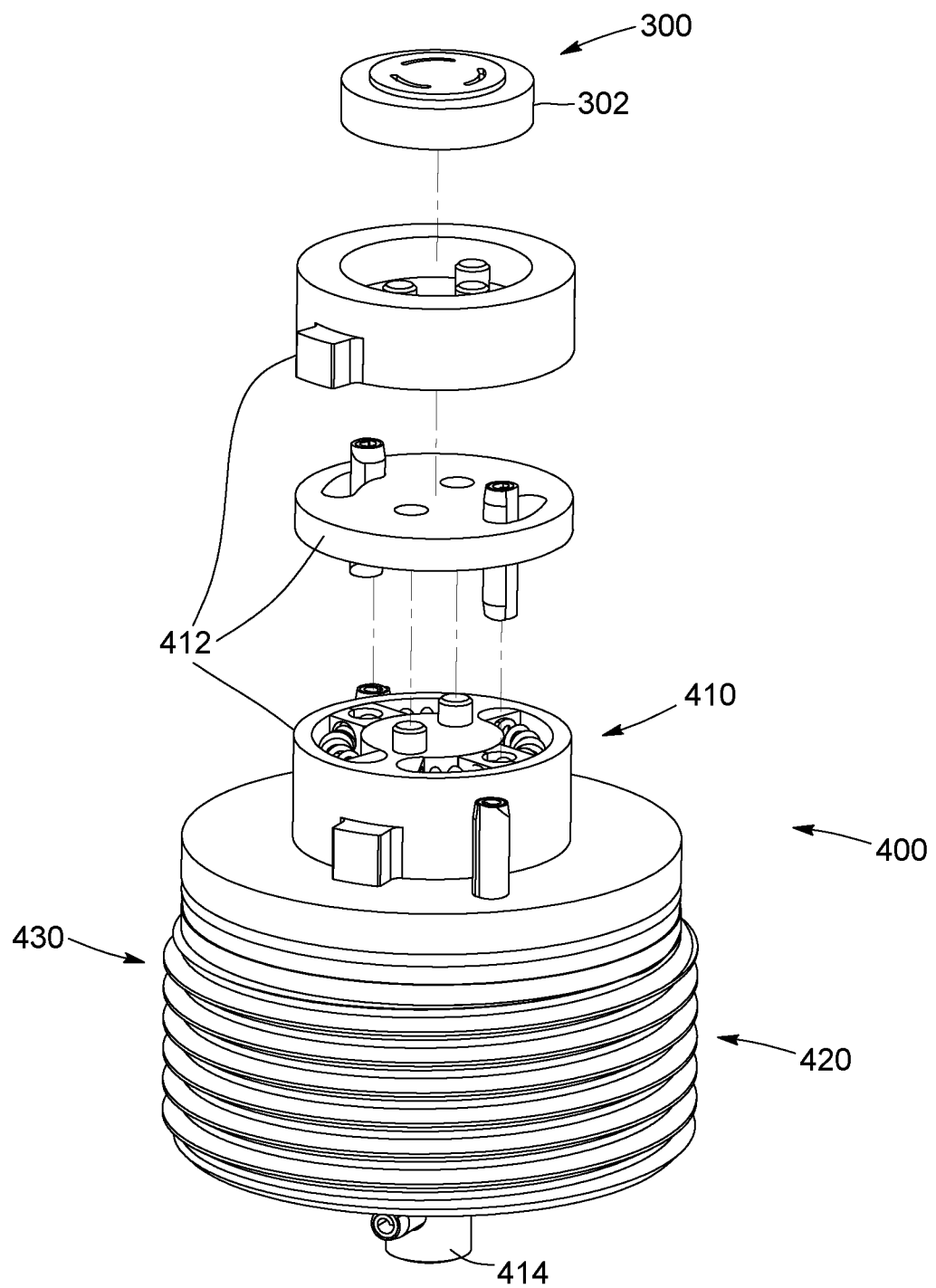
FIG. 8 is a side perspective and partially exploded view of the actuation assembly of FIG. 7, showing a cartridge and a rotor head of the rotation mechanism.
Figure 9:
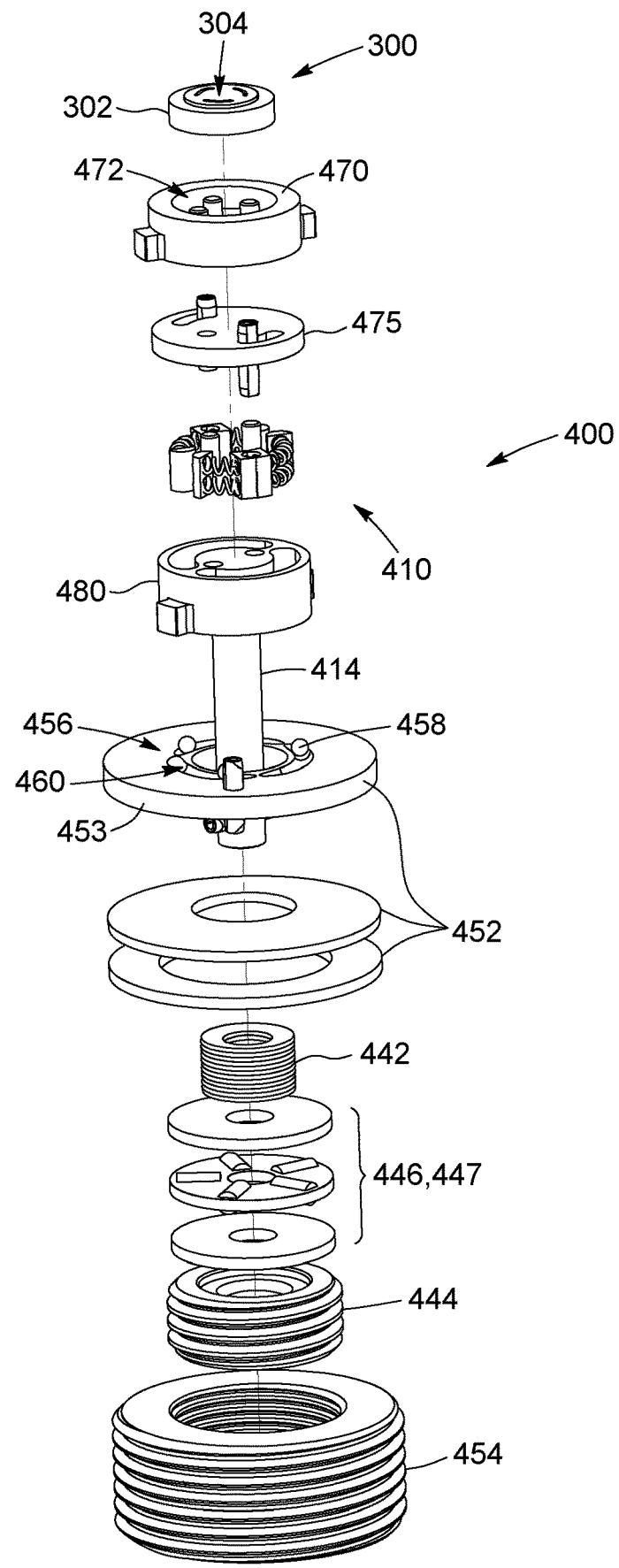
FIG. 9 is an exploded side perspective view of the components of the actuation assembly of FIG. 7.

Now referring to FIGS. 7 to 9, in this embodiment, the cartridge 302 can be received by a portion of the actuation assembly 400 which is adapted to displace (e.g., rotate) the cartridge 302 relative to the valve body and valve cap. More specifically, the actuation assembly 400 includes a rotation mechanism 410, which can also be referred to as the "rotor" of the valve, configured to rotate the valve element 300 (e.g., the cartridge 302) to selectively align the channels 310 with the process ports opening on the cap interface. In this embodiment, the rotation mechanism 410 includes a rotor head 412 adapted to receive the cartridge 302, and a rotor arm 414 connected to the rotor head 412. The rotor arm 414 is operable to rotate the rotor head 412, therefore rotating the cartridge 302 provided in the rotor head 412. It should therefore be understood that rotating the rotor arm 414 effectively rotates the cartridge 302, thereby moving the valve in different operational positions. In other types of valves, other mechanisms to move the cartridge relative to the valve ports can be considered.

The actuation assembly 400 can include a load varying mechanism 420 configured to create a variable load to urge the valve element 300 against the valve cap 100. The applied load can vary based on the different positions of the valve element 300. The load varying mechanism 420 can thereby be adapted to apply different sealing load forces to have the valve element 300 sealingly engage the valve cap 100 based on the different positions of the valve element 300. The expression "sealing load force" refers to the force used or required to create and maintain a seal between the valve element interface 304 and the cap interface 106. More specifically, in this embodiment, the load varying mechanism 420 is adapted to cooperate with the rotation mechanism 410, which houses the valve element 300, such that urging a portion of the rotation mechanism 410 upwardly (e.g., towards the valve cap 100) correspondingly urges the valve element interface 304 towards the cap interface 106. In other words, the load varying mechanism 420 can be configured to indirectly engage the valve element 300, although it is appreciated that, in alternative embodiments, the load varying mechanism 420 can be configured to engage the valve element directly.

In the present embodiment, when the valve 10 is operated, the load varying mechanism 420 engages the valve element 300 in a manner such that a greater sealing load force is applied when process conduits are in fluid communication (via the channels 310) or are blocked. Moreover, the load varying mechanism 420 can cooperate with the valve element 300 such that a lower sealing load force is applied when the valve element 300 is rotated, i.e., when a lower level of sealing is acceptable or desired. Reducing the sealing load force, which can also be viewed as releasing the pressure on the valve element, reduces friction between the cap interface and cartridge interface to facilitate rotation of the valve element. It is noted that without reducing the sealing load force prior to rotating the valve element 300, the frictional forces between the cap interface and cartridge interface can cause damages to various components of the valve 10 and/or undesired movement of one or more components of the valve 10.

In this embodiment, moving the valve element 300 from one position to another includes operating the rotation mechanism 410 to rotate the valve element 300 and align the desired process conduits with the desired channels 310. As seen in FIGS. 10A to 10E, when in a given operating position (e.g., illustrated in FIGS. 10A and 10E), the sealing load force corresponds to a higher sealing force, represented as MAX LOAD in FIG. 13. Moreover, when rotating the valve element 300 between operational positions, the load varying mechanism 420 relieves some of the pressure such that a lower sealing force load is applied to facilitate rotation. In this embodiment, the sealing load force is reduced from MAX LOAD to MIN LOAD, which corresponds to the force applied during movement of the valve element (e.g., illustrated in FIGS. 10B to 10D).

With reference to FIGS. 5 to 9, the load varying mechanism 420 can be configured to adjust the value of the MAX LOAD and the MIN LOAD such that the higher and lower sealing force loads can be selectively adjusted. More specifically, in this embodiment, the load varying mechanism 420 includes a biasing element assembly 430 configured to adjust the value of at least one of the MAX LOAD and the MIN LOAD. The biasing element assembly 430 includes a first biasing element 440 installed within the internal chamber 210 of the valve body 200. The first biasing element 440 (identified on FIG. 5) operatively engages the rotation mechanism 410 in order to bias a portion of the valve element 300 (e.g., the cartridge interface 304) against the valve cap 100 (e.g., against the cap interface 106). In the present embodiment, the first biasing element 440 is configured to apply a predetermined sealing load force on the valve element 300 which corresponds to a generally constant minimum sealing load force (i.e., MIN LOAD).

As seen in FIGS. 5, 6 and 9, the first biasing element 440 includes a stack of Belleville washers 442 engaging the rotation mechanism 410 (e.g., the rotor head 412), and an inner screw connector 444 engaged with the stack of Belleville washers 442 and operable to adjust the load on the stack of Belleville washers 442. It should thus be noted that the inner screw connector 444 is threaded into the internal chamber 210 (e.g., to the outer screw connector 454), and that tightening the inner screw connector 444 pushes against the stack of Belleville washers 442, thereby applying a greater load on the rotor head 412, i.e., adjusts the value of the MIN LOAD. For example, the value of the minimum sealing load force can be adjusted between about 25 psi and 75 psi, such that the cartridge interface 304 sealingly engages the cap interface 106 by a corresponding amount of pressure.

In the present embodiment, the first biasing element 440 can further include a bearing 446 provided between the stack of Belleville washers 442 and inner screw connector 444. The bearing 446 is adapted to support the axial load applied on the stack of Belleville washers 442 provided by the inner screw connector 444. In other words, the inner screw connector 444 is operable to apply a sealing load force on the bearing 446, which transfers the load onto the stack of Belleville washers 442, which in turn applies the load on the rotor head 412 to have the cartridge interface sealingly engage the cap interface. In this embodiment, the bearing 446 is a cylindrical thrust roller bearing 447 configured to support the axial load provided by the inner screw connector 444 while allowing (i.e., not impeding) rotation of the inner screw connector 444. In addition, the first biasing element 440 can include a rotation sleeve 448 (identified on FIG. 5 et 6) mounted to the rotor arm 414, and onto which the inner screw connector 444 is mounted. The rotation sleeve 448 is configured to prevent rotation of the inner screw connector 444 when operating (e.g., rotating) the rotor arm 414, and vice versa. However, it is appreciated that other configurations of the first biasing element 440 and/or each component thereof are possible and may be used.

Still referring to FIGS. 5, 6 and 9, the biasing element assembly 430 includes a second biasing element 450 installed within the internal chamber 210 of the valve body 200. The second biasing element 450 operatively engages the rotation mechanism 410 in order to selectively bias a portion of the valve element 300 (e.g., the cartridge interface 304) against the valve cap 100 (e.g., against the cap interface). In the present embodiment, the second biasing element 450 is configured to apply a predetermined sealing load force on the valve element 300 which corresponds to a desired sealing load force for when the valve 10 is in an operational position (i.e., for conducting fluid between two process conduits). It is appreciated that the sealing load force applied to the valve element when in an operational position can correspond to the MAX LOAD, and can be referred to as an operational sealing load force.

As seen in FIGS. 6 and 9, the second biasing element 450 includes an outer stack of Belleville washers 452 engaging the rotation mechanism 410 (e.g., the rotor head 412), and an outer screw connector 454 engaged with the outer stack of Belleville washers 452. The load varying assembly 420 can also include a load variator 456 provided between the outer stack of Belleville washers 452 and the rotor head 412. As will be described further below, the load variator 456 is adapted to dynamically vary the sealing load force being applied on the rotor head 412 (e.g., for the cartridge interface to engage the cap interface) during rotation of the rotor (e.g., rotor arm 414 and rotor head 412). More specifically, the load variator 456 is configured to adjust the sealing load force from the MAX LOAD value to the MIN LOAD value, and back to the MAX LOAD value when moving the valve 10 from one operational position to another.

In this embodiment, it is noted that the outer screw connector 454 is threaded into the internal chamber 210 (e.g., to the body 200), and that tightening the outer screw connector 454 pushes against the outer stack of Belleville washers 452, thereby engaging the load variator 456 in order to apply a greater operational sealing load force on the rotor head 412, i.e., adjusting the value of the MAX LOAD. For example, the value of the operational sealing load force can be adjusted between about 250 psi and 750 psi, such that the cartridge interface 304 sealingly engages the cap interface 106 by a corresponding amount of pressure when conducting fluid between a pair of process conduits. In some embodiments, it is noted that the MIN LOAD and MAX LOAD values can be dependent from one another, for example, by a predetermined ratio. In exemplary embodiments, the MAX LOAD value can be greater than the MIN LOAD VALUE by a factor 2, 5, 10, 15, 25, 50, 100 or any other suitable factor. Furthermore, the MIN LOAD and MAX LOAD values can be chosen based on various elements, such as the type of fluid being used, the operating temperature of the valve, the fluid pressures being used, the application for which the valve is being used and the materials of the valve and associated components, for example.

In some embodiments, the inner screw connector 444 and outer screw connector 454 can be tightened and/or loosened within the internal chamber 210 independently form one another. For some valve configurations, screwing and unscrewing screw connector 454 can affect screw connector 444, but screw connector 444 can then be readjusted afterward. As such, it is noted that the MIN LOAD value and MAX LOAD value can correspondingly be adjusted independently from one another. In this embodiment, and as illustrated in FIGS. 5 and 6, the inner screw connector 444 is threaded within the central aperture of the outer screw connector 454, and the cylindrical thrust roller bearing 447 is also provided within the outer screw connector 454 (e.g., above the inner screw connector 444). Additionally, the stack of Belleville washers 442 corresponds to an inner stack of Belleville washers 442 positioned in a central aperture of the outer stack of Belleville washers 452 such that the load forces can be applied to corresponding stacks of Belleville washers 442, 452 (via their respective screw connectors 444, 454) independently. In other words, the first biasing element 440 can be operated independently from the second biasing element 450.

At least one of the first and second biasing elements 440, 450 can be provided with a locking mechanism adapted to selectively lock the rotation of the biasing elements, thereby preventing further adjustments of the MIN LOAD and MAX LOAD values. During operation, the biasing elements 440, 450 can be unlocked via their respective locking mechanisms, adjusted to a desired position and locked in place. Locking the biasing elements can prevent undesirable and/or accidental movement of these components, for example, due to vibrations of the valve during operation.

Figure 16:
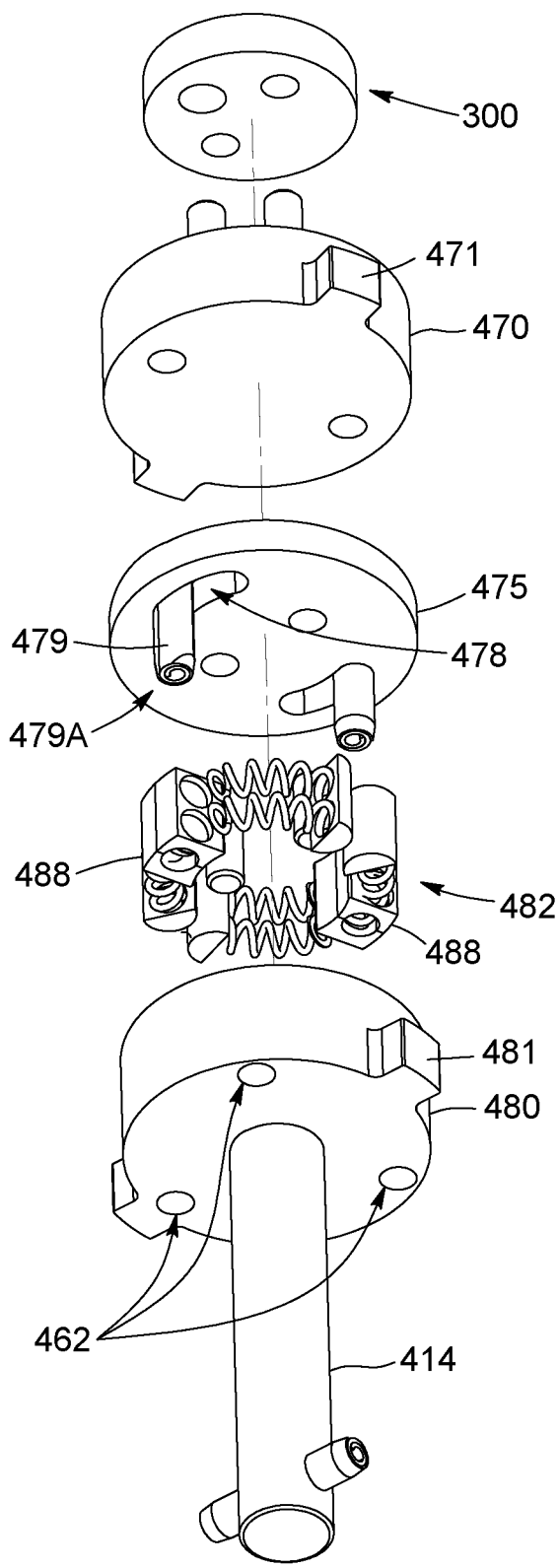
FIG. 16 is an exploded bottom perspective view of the rotor head of FIG. 14, showing the rotator head provided with bearing slots, according to an embodiment.

In some embodiments, and with reference to FIGS. 5, 6, 9 and 12A to 12E, the load variator 456 includes a set of ball bearings 458 provided between the rotor head 412 and the outer stack of Belleville washers 452. The load variator 456 further includes grooves 460 shaped and sized to receive one of the ball bearings 458. In this embodiment, the grooves 460 are defined in a disk or annular plate, such as an uppermost washer 453 of the outer stack of Belleville washers 452. In addition, the rotor head 412 is provided with a plurality of ball bearing slots 462 (seen in FIG. 16) for receiving a corresponding one of the ball bearings 458. During rotation of the rotor head 412, the ball bearings 458 are adapted to rotate within their ball bearing slot 462, and roll along their corresponding groove 460. As such, the length of the grooves 460 can correspond to the range of motion of the rotor head 412 (or at least a portion thereof), i.e., the ball bearing 458 can roll back and forth from one end of the groove 460 to the other. In this embodiment, positioning the ball bearings 458 proximate the ends of their respective grooves 460 corresponds to an operational position of the valve 10. As such, it is appreciated that the valve 10 has at least two operational positions, although it is appreciated that other configurations are possible. It will be understood that in alternative embodiments, the ball bearing slots can be provided in the uppermost washer 453 and that the grooves can be provided on the bottom face of the rotor head. In addition, instead of a ball bearing, a waved profile could be formed one of the components forming the load variator. Other mechanisms can also be considered.

As best seen in FIGS. 12A to 12E, each groove 460 has a varying depth from one end to another such that when the rotor head rotates, the ball bearings 458 move along their respective grooves 460, applying a variable load to the rotor head corresponding to the position of the ball bearings 458 along the grooves 460. The load variator 456 can include a cam-like surface which, when rotating the rotor arm 414, transforms the rotary motion into a translation of the rotor-head biasing elements, in this case formed by the stack of Belleville washers 452. The translation occurs along the rotational axis, i.e along the rotor arm. More specifically, each groove 460 includes sloped regions 464 at either ends thereof and a substantially leveled region 465 between the sloped regions 464. In this embodiment, the depth of the groove 460 is greatest along the leveled region 465, and the depth gradually decreases along the sloped regions 464 until the ends of the groove 460. It is noted that axial vertical movement of the outer stack of Belleville washers 452 is blocked (e.g., above by the rotor head 412, and below by the threaded outer screw connector 454). Therefore, rotating the rotor head 412 to position the ball bearings 458 to the sloped regions 464 of the grooves 460 creates a downward force on the outer stack of Belleville washers 452. The outer stack of Belleville washers 452 then compresses due to the downward force and transfers the compression forces to the rotor head 412, thereby increasing the sealing load force on the cartridge interface 304. The one or more grooves have a varying depth which causes the ball bearings to apply a varying load on the valve element, by varying the compression forces applied to the rotor head. In some embodiments, the ball bearings 458 can be moved to any suitable location along the sloped regions 464 to create a corresponding force on the rotor head. The ball bearings 458 are moved atop the uppermost washer 453, within their respective grooves 460.

In some embodiments, the rotor head 412 can be adapted to cooperate with the load variator 456 in a manner such that rotation of the valve element 300 generally occurs when the sealing load force corresponds to, or is at least proximate to, the lowest or minimal load value (MIN LOAD value—e.g., when the ball bearings 458 are within the leveled or deepest region 465). In other words, the rotor head 412 can be adapted to maintain the valve element 300 generally unmoved while the load variator reduces the sealing load force being applied to the valve element 300 prior to rotating the valve element 300. It should therefore be understood that the rotor head 412 enables the valve element 300 to remain substantially unmoved while the sealing load forces are adjusted from the minimal or lowest load (MIN LOAD) to the maximum or highest load (MAX LOAD), or vice versa. As previously mentioned, without reducing the sealing load force prior to rotating the valve element 300, the frictional forces between the cap interface and cartridge interface can cause damages to various components of the valve 10 and/or undesired movement of one or more components of the valve 10. Moreover, without increasing the sealing load force when the valve is in an operational position, fluid can leak through interstices between the cartridge interface and the cap interface.

In some embodiments, and as seen in FIGS. 9 and 14 to 16, the rotor head includes a top portion 470 adapted to receive and/or hold the valve element 300, a bottom portion 480 engageable with the load variator 456 and being connected to the rotor arm 414, and a transition portion 475 coupled between and linking the top portion 470 with the bottom portion 480. As will be described further below, the bottom portion 480 of the rotor head 412 is adapted to at least partially rotate, over a small angular displacement, independently with respect to the top portion 470 such that the load variator 456 can be operated to adjust the sealing load force without rotating the valve element 300. The rotor head may thus include at least a first and a second component, where the first component can interact or receive the valve element to control which process ports are blocked or put in communication, and where the second component interacts or forms part with the load variator, which adjusts the load force applied on the first component and valve element. While rotation of the second component drives the rotation of the first component, the configuration of the first and second components is such that, over a given angular path, the first and second components are "decoupled". The second component can thus be rotated over an angular path that is greater than the angular path of the first component. The extra angular displacement by the second component allows increasing the load, via the load variator, on the valve element when the valve element is in an operational position (positions A and E).

In this embodiment, the top portion 470 is provided with a valve element receiving cavity 472 configured to receive and/or retain the valve element 300 therein. The valve element receiving cavity 472 can be shaped and sized to receive the cartridge 302. The cartridge 302 can be oriented within the cavity 472 with the use of dowel pins 473 (or any other devices, tools, mechanisms, etc.) such that rotation of the cartridge 302 is initiated via rotation of the top portion 470. In the illustrated embodiment, the cartridge 302 is oriented via three dowel pins 473 (identified on FIG. 15), although it is appreciated that any suitable number of dowel pins can be used. In order to position the cartridge in the desired orientation (e.g., in the operational positions), the top portion 470 can be provided with a top abutment 471 adapted to abut against an inner wall of the internal chamber 210 of the valve body, thereby preventing further rotation of the top portion (and thus of the cartridge). As mentioned, the bottom portion 480 is adapted to engage the load variator 456. For example, in this embodiment, the bottom portion 480 includes the ball bearing slots 462 configured to house the ball bearings 458 of the load variator 456.

The transition portion or element 475 (identified on FIGS. 9 and 15) further includes a pair of transition slots 478 adapted to receive alignment pins 479 extending therethrough for joining the top portion 470 with the bottom portion 480. In this embodiment, the alignment pins 479 are spring pins which have a first end 479a adapted to engage the bottom portion 480, and a second, opposite end 479b adapted to engage the top portion 470. In this embodiment, the transition portion 475 is aligned with (e.g., oriented relative to) the bottom portion 480 via dowel pins 476 such that rotation of the bottom portion 480 engages the transition portion 475 in rotation as well. In the present embodiment, the transition slots 478 are shaped and sized to enable movement of the alignment pins 479 therealong (e.g., when rotating the bottom portion 480). It should be understood that the alignment pins 479 are configured to link (e.g., mechanically couple) the bottom portion 480 to the top portion 470 such that rotation of the bottom portion 480 enables rotation of the top portion 470 and valve element 300. As will be further described below, it is noted that when the alignment pins 479 abut against an extremity of the transition slots 478, further rotation of the alignment pins 479 along the slots (i.e., in the same direction) is prevented. Therefore, further rotation of the top portion 470, and thus of the valve element 300, is also prevented. In some embodiments, the top portion 470 can be provided with top abutments 471 adapted to abut against a wall/surface within the internal chamber of the valve body to further prevent rotation of the top portion. Separating the rotor head in distinct first and second portions (such as top and bottom portions) allows controlling the load applied onto the valve element based on operational positions thereof, by releasing the load applied on the valve element prior to beginning the rotation, which in turn reduces wear and tear on the valve element.

In possible embodiments, the first and second portions of the rotor head are sized, shaped and configured such that one of portion has a greater range of rotational motion than the other portion. Still referring to FIGS. 9, 14 to 16, in addition to FIGS. 11A to 11E, the bottom portion 480 of the rotor head is adapted to have a greater range of motion then the top portion 470. Therefore, the bottom or second portion 480 can rotate further than the first or top portion 470, thereby keeping the valve element 300 generally static (i.e., stationary) as the bottom portion 480 rotates and/or engages the load variator 456. In this embodiment, the bottom portion 480 is provided with a driving mechanism 482 configured to enable rotation of the top portion 470 via rotation of the bottom portion 480, while also enabling the greater range of motion to the bottom portion 480 relative to the top portion 470. In some embodiments, the bottom portion 480 can be provided with bottom abutments 481 adapted to abut against a wall/surface within the internal chamber of the valve body to further prevent rotation of the bottom portion.

Figure 15:
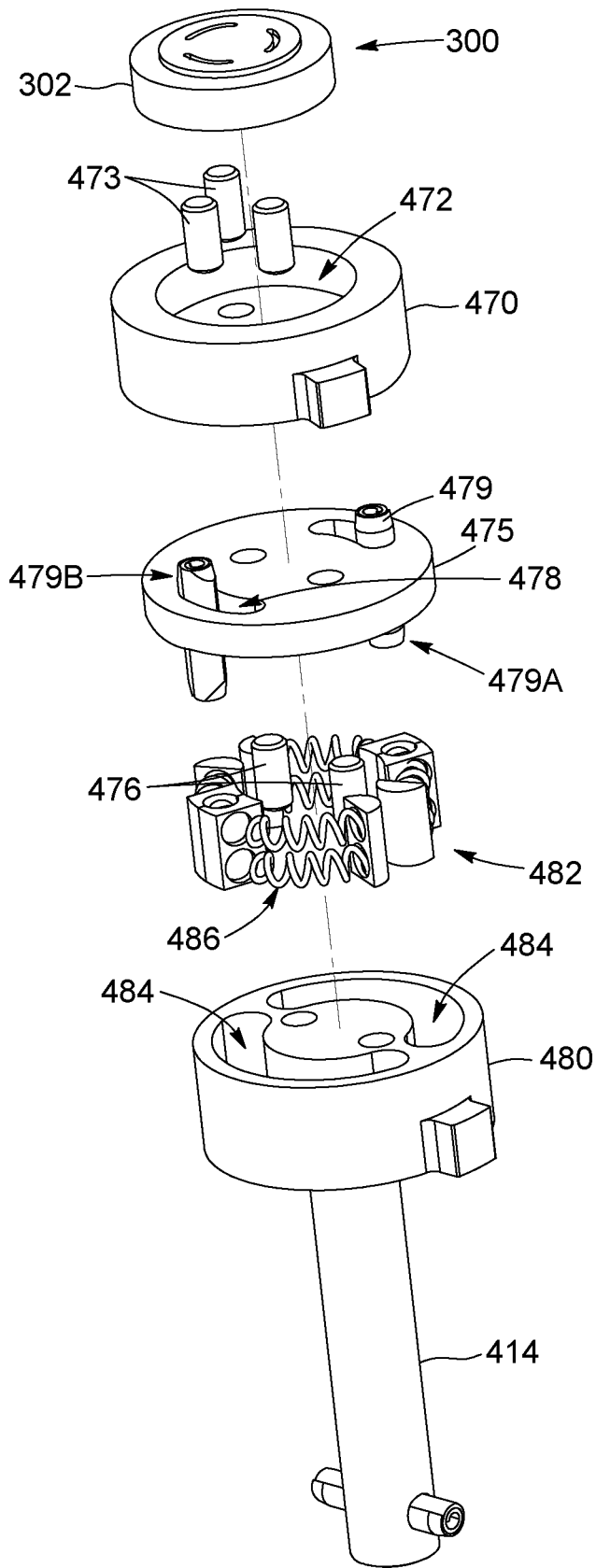
FIG. 15 is an exploded side perspective view of the rotor head of FIG. 14.

As seen in FIG. 15, the bottom portion 480 can be adapted to house the driving mechanism 482. More specifically, in this embodiment, the driving mechanism 482 includes resilient elements 486, such as springs or other compressible material, and the bottom portion 480 is provided with bottom slots 484 shaped and sized for housing the resilient elements 486. In some embodiments, the resilient elements 486 can be adapted to be engaged by the alignment pins 479, and are designed to move the alignment pins 479 along their respective transition slots 478 via rotation of the bottom portion 480, which, as described above, drives the top portion 470 (i.e., enables rotation of the top portion 470). In this embodiment, the driving mechanism 482 includes two resilient elements 486 (e.g., one for each alignment pin 479), although other configurations are possible.

Figure 11C:
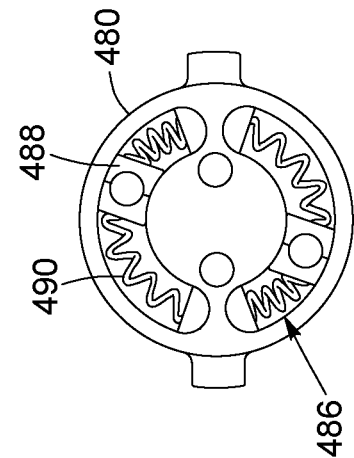
FIGS. 11A to 11E are top plan views of the bottom portion of the rotor head, showing the driving mechanism provided therein, at different positions of the bottom portion, according to a possible embodiment.
Figure 11E:
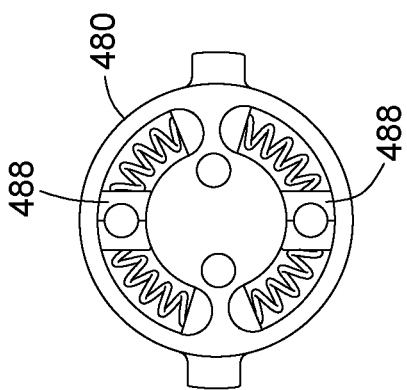
Figure 11A:
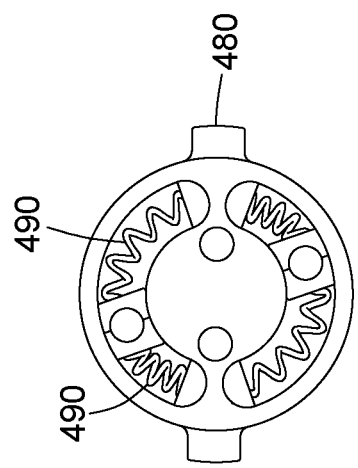
Figure 11D:
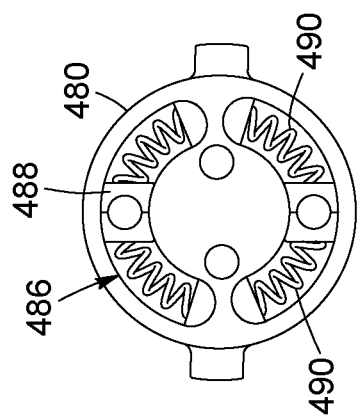
Figure 11B:
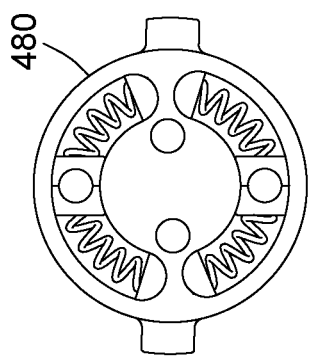

With reference to FIGS. 11A to 11E, in the present embodiment, each resilient element 486 includes a pin compartment 488 along with one or more springs 490 provided on either side of the pin compartment 488. For example, and as seen in FIG. 15, the springs 490 can include stacks of springs provided on either side of the pin compartment. Each stack of springs can include two springs positioned one on top of the other, although it is appreciated that the stack can include more springs (e.g., three, four, five, etc.) arranged in any suitable configuration. The pin compartment 488 can be adapted to retain the alignment pin 479 therein during rotation of the bottom portion 480 (via rotation of the rotor arm 414), with the springs 490 on either side being configured to maintain the pin compartment 488 in position during rotation of the top and bottom portion 470, 480. More specifically, the springs 490 are adapted to retain their shape within the bottom slots 484 during rotation of the top portion 470. Once the top portion 470 has completed its rotation and the alignment pins 479 abut against the end of their respective transition slots, the bottom portion 480 can be rotated further, which compresses the spring(s) 490 on a first side of the pin compartment 488, and stretches the spring(s) 490 on a second side of the pin compartment (as seen in FIGS. 11A and 11E). Referring 12A to 12E, in addition to 11A to 11E, it is noted that the additional range of motion of the second/bottom portion 480 corresponds to the required movement of the second/bottom portion 480 to move the ball bearings 458 onto the sloped region 464 of their respective grooves 460. In other words, the additional range of motion of the bottom portion 480 allows for a greater sealing load force to be applied to the rotor head (e.g., to the cartridge), while keeping the valve element (or cartridge) static due to the abutment of the alignment pins 479 within their transition slots 478 which prevents further rotation of the first/top portion 470.

Figure 17C:
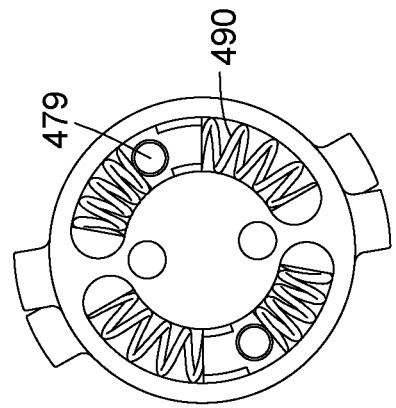
Figure 17A:
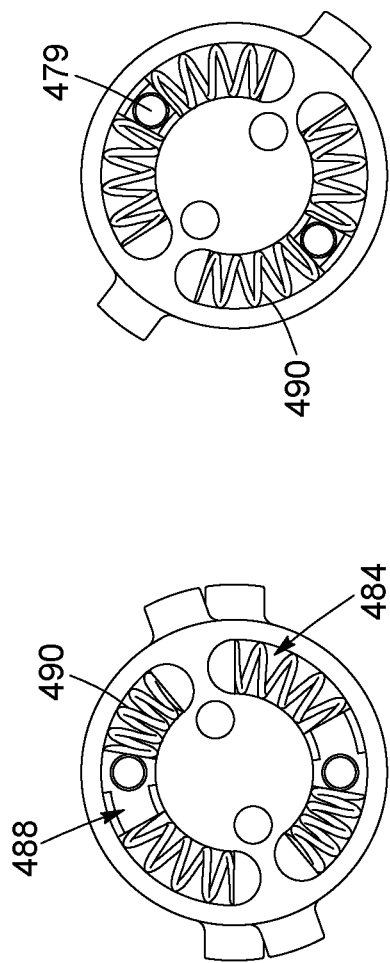
Figure 17E:
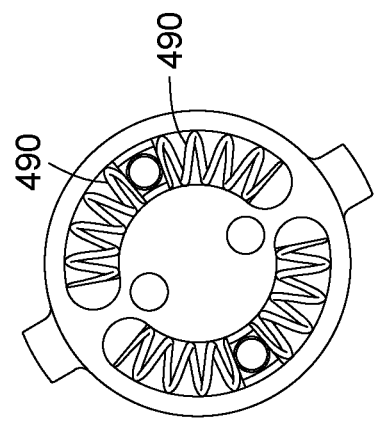
Figure 17B:
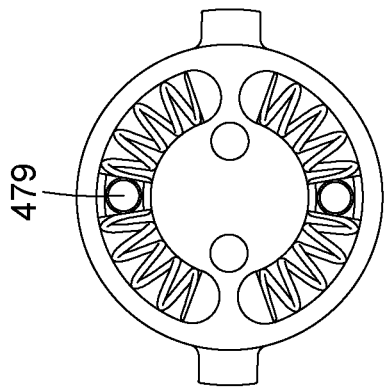

In an alternative embodiment, and with reference to FIGS. 17A to 17E, the pin compartment 488 can be integrally formed as part of the bottom slots 484 of the bottom portion 480 such that it is not displaced along the bottom slots during rotation of the rotor. In this embodiment, the pin compartment 488 defines spring abutments on either side thereof and on which the springs 490 can abut. As seen in FIGS. 17A and 17E, when the bottom portion is rotated further, the alignment pins 479 are displaced outside of the pin compartment 488 and along their respective bottom slots towards one of the springs 490. The springs 490 on a first side of the pin compartment illustratively compresses, while the spring on the second side remains generally static within its portion of the bottom slot 484, and thereby does not apply a force on the alignment pin.

It should be noted that, in each of the described embodiments above, each spring 490 included in the driving mechanism 482 can have respective stiffnesses such that the force applied to the alignment pins 479 is different for each spring when compressed and/or stretched. However, it is appreciated that other configurations are possible, such as each spring of a given stack having generally the same stiffness, or every spring of the valve having the same stiffness, for example.

Figure 10A:
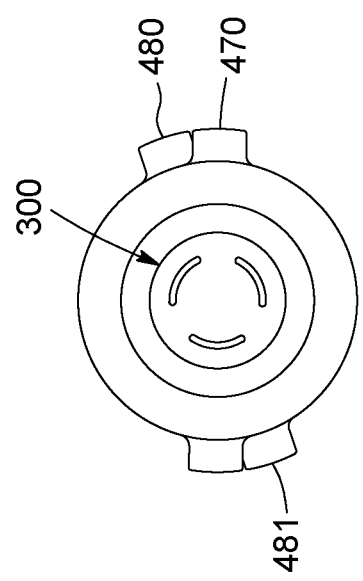
FIGS. 10A to 10E are top plan views of the valve element and the rotor head, showing the components at different positions, according to a possible embodiment.
Figure 10C:
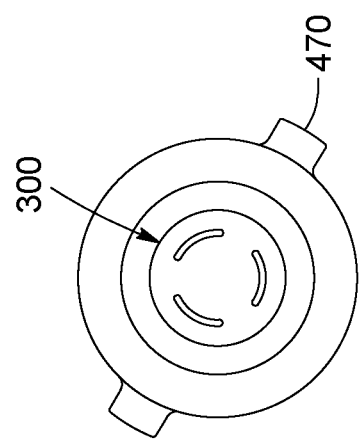
Figure 13:
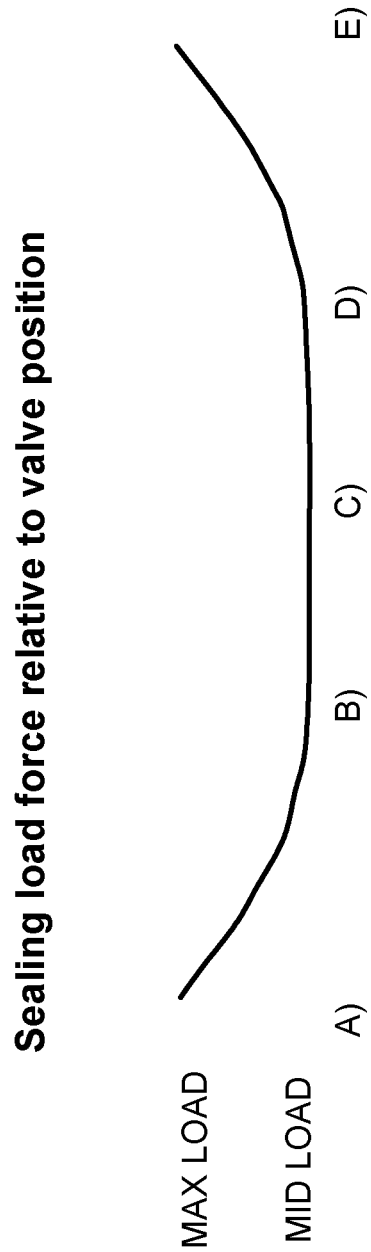
FIG. 13 is a graphic showing the sealing load force according to the position of the valve, where the transition between a maximum load and a minimal load is defined by movements and positions of the components of FIGS. 10A to 12E.
Figure 14:
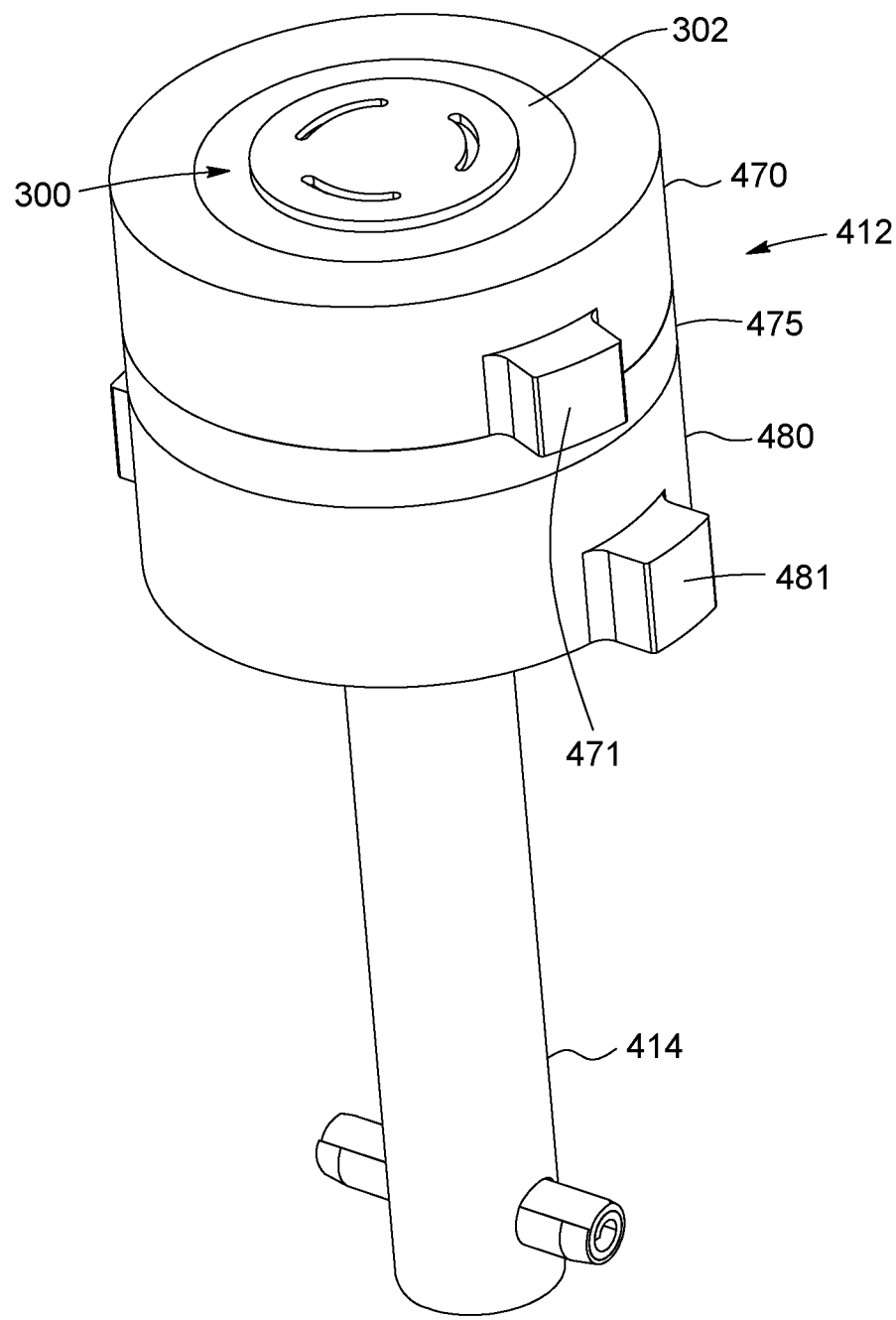
FIG. 14 is a top side perspective view of a rotor head, according to a possible embodiment.

Referring broadly to FIGS. 10A to 13, the positions and configurations of the valve element 300 (FIGS. 10A to 10E), of the driving mechanism 482 (FIGS. 11A to 11E), of the ball bearings 458 (FIGS. 12A to 12E), along with the sealing load force distribution (FIG. 13) are illustrated. More specifically, FIGS. 10A to 13 show each of the mentioned components during movement of the valve 10 from one operational position to another. For example, FIG. 10A illustrates the position of the valve element 300 when the valve is in a first operational position (position A). It is noted that the bottom portion 480 is not aligned with the top portion 470 due to its greater range of motion. As explained above, and illustrated in FIG. 11A, the corresponding springs 490 of the driving mechanism 482 are compressed and stretched to enable this greater range of motion of the bottom portion 480. In addition, FIG. 12A shows that, when in the first operational position, the ball bearing 458 is positioned along one of the sloped regions 464 of the groove 460. Correspondingly, the sealing load force being applied to the valve element is the maximal load (MAX LOAD), as seen in FIG. 13.

Rotating the rotor arm 414 engages the bottom portion 480 in rotation towards position B, where the top and bottom portions are aligned (FIG. 10B), the springs 490 of the driving mechanism are no longer deformed (FIG. 11B) and the ball bearings 458 are positioned in the leveled region of the groove (FIG. 12B). In this position, the sealing load force is relieved and reduced towards the minimal load (MIN LOAD) (FIG. 13, position B). It is noted that moving from position (A) to position (B) does not involve a rotation of the valve element 300, but includes a reduction of the sealing load force to facilitate further rotation. In this embodiment, further rotation of the rotor arm enables simultaneous rotation of both the bottom and top portions (FIGS. 10C and 10D) such that the springs 490 of the driving mechanism 482 remain uncompressed/unstretched (FIGS. 11C and 11D), the ball bearings remain in the leveled region (FIGS. 12C and 12D), thereby keeping the sealing load force substantially constant at MIN LOAD (FIG. 13, positions C and D).

Figure 10E:
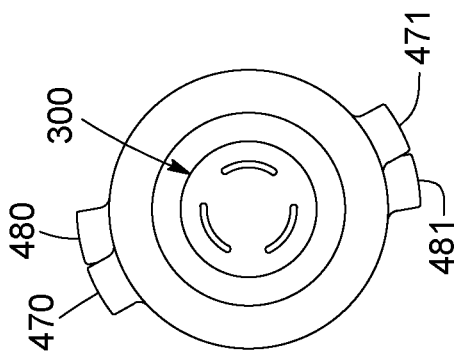
Figure 10B:
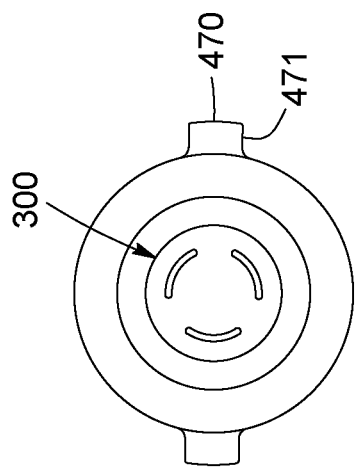
Figure 10D:
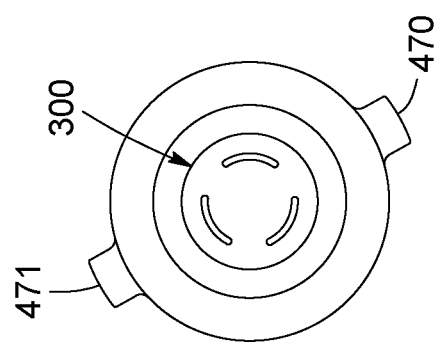

Finally, from position (D) to position (E), the top portion 470 remains static while the bottom portion 480 is rotated further (FIG. 10E). It is understood that the springs 490 are correspondingly compressed/stretched (FIG. 11E) to allow the ball bearing to move onto the sloped region (FIG. 12E) which increases the sealing load force back to the maximum load (MAX LOAD) (FIG. 13, position E), thereby positioning the valve in a second operational position. It is therefore appreciated that the method for dynamically relieving the sealing load force prior to rotating the valve element using the valve described above can include the sole step of rotating the rotor arm. Similarly, increasing the sealing load force to operate the valve in an operational position can also include the step of rotating the rotor arm (e.g., in the same direction as for the step of relieving the sealing load force).

A corresponding method for channeling a fluid between different process conduits of the above-described valve can include the steps of: a) applying a sealing load force when the valve element is stationary and the valve is in operation, and b) applying a reduced sealing load force while moving the valve between at least two different operational positions. It is noted that the sealing load force being applied is generated irrespectively of the fluid pressure within the process conduits of the valve.

Moreover, although the embodiments of the valve and corresponding parts thereof consist of certain geometrical configurations as explained and illustrated herein, not all of these components and geometries are essential and thus should not be taken in their restrictive sense. It is to be understood, as also apparent to a person skilled in the art, that other suitable components and cooperation thereinbetween, as well as other suitable geometrical configurations, may be used for the valve, as it is briefly explained herein and as can be easily inferred herefrom by a person skilled in the art. Moreover, it is appreciated that positional descriptions such as "top", "bottom", "above", "below", "left", "right" and the like should, unless otherwise indicated, be taken in the context of the figures and should not be considered limiting.

Furthermore, in the context of the present description, it will be considered that all elongated objects will have an implicit "longitudinal axis" or "centerline", such as the longitudinal axis of a rotor arm for example, and that expressions such as "connected" and "connectable", or "mounted" and "mountable", may be interchangeable, in that the present invention includes various components for assembling a resulting fully-assembled and fully-operational valve, and/or associated actuation assembly.

Moreover, components of the present invention and/or steps of the method(s) described herein could be modified, simplified, altered, omitted and/or interchanged, without departing from the scope of the present invention, depending on the particular applications which the present invention is intended for, and the desired end results, as briefly exemplified herein and as also apparent to a person skilled in the art.

Several alternative embodiments and examples have been described and illustrated herein. The embodiments of the invention described above are intended to be exemplary only. A person of ordinary skill in the art would appreciate the features of the individual embodiments, and the possible combinations and variations of the components. A person of ordinary skill in the art would further appreciate that any of the embodiments could be provided in any combination with the other embodiments disclosed herein. It is understood that the invention may be embodied in other specific applications or configurations. The present examples and embodiments, therefore, are to be considered in all respects as illustrative and not restrictive, and the invention is not to be limited to the details given herein. Accordingly, while the specific embodiments have been illustrated and described, numerous modifications come to mind without significantly departing from the invention.

In the present disclosure, an embodiment is an example or implementation of the chromatography valve. The various appearances of "one embodiment," "an embodiment" or "some embodiments" do not necessarily all refer to the same embodiments. Although various features may be described in the context of a single embodiment, the features may also be provided separately or in any suitable combination. Conversely, although the valve may be described herein in the context of separate embodiments for clarity, it may also be implemented in a single embodiment. Reference in the specification to "some embodiments", "an embodiment", "one embodiment", or "other embodiments", means that a particular feature, structure, or characteristic described in connection with the embodiments is included in at least some embodiments, but not necessarily in all embodiments.

It should also be appreciated that similar features of the drawings have been given similar reference numerals. To preserve the clarity of the drawings, some reference numerals have been omitted when they were already identified in a preceding figure.

The invention claimed is:

1. A chromatography valve for use in fluid analysis and chromatography applications, the chromatography valve comprising:
    a valve cap provided with a plurality of process conduits extending therethrough, the valve cap having a cap interface, and each one of the process conduits comprising a process port opening on the cap interface;
    a valve body engageable with the valve cap and having a body interface adapted to face the cap interface, the valve body comprising an internal chamber provided with an opening defined in the body interface;
    a valve element provided in the opening of the valve body and having a valve element interface adapted to engage the cap interface, the valve element comprising at least one channel adapted to establish fluid communication between a pair of process conduits to enable fluid flow through selected ones of the process conduits via the at least one channel; and
    an actuation assembly provided within the internal chamber of the valve body, comprising:
        a rotation mechanism operable to rotate the valve element between two or more operational positions for controlling fluid circulation between the process conduits; and
        a load varying mechanism adapted to apply a sealing load force on the valve element such that the valve element interface engages the cap interface, the load varying mechanism being adapted to cooperate with the rotation mechanism to selectively reduce and increase the sealing load force within a range of sealing load forces via operation of the rotation mechanism,
        wherein the rotation mechanism comprises a rotor arm adapted to be rotated, and a rotor head operatively connected to the rotor arm, the rotor head comprising a valve element receiving cavity configured to house the valve element, and wherein rotation of the rotor arm correspondingly rotates the rotor head and the valve element, wherein the rotor head comprises a first portion provided with the valve element receiving cavity, a second portion interfacing with the load varying mechanism and a transition portion adapted to link the first portion to the second portion, the second portion being connected to the rotor arm, the second portion being adapted to at least partially rotate, over an angular displacement, independently with respect to the first portion to adjust the sealing load force without rotating the valve element.

2. The chromatography valve according to claim 1, wherein the first portion is a top portion, and the second portion is a bottom portion, the transition portion comprises alignment pins extending therethrough and engaging the top and bottom portions such that rotation of the bottom portion engages the top portion in rotation.

3. The chromatography valve according to claim 2, wherein the transition portion comprises transition slots shaped and sized to receive a corresponding one of the alignment pins, wherein the alignment pins are adapted to move along the transition slots during rotation of the bottom portion, thereby engaging the top portion in rotation, and wherein the alignment pins are adapted to abut against an extremity of their respective transition slots to prevent further rotation of the top portion.

4. The chromatography valve according to claim 3, wherein the bottom portion comprises a driving mechanism having resilient elements housed within the bottom portion, the alignment pins being adapted to engage the resilient elements, and wherein further rotation of the bottom portion when the alignment pins abut against the extremity of their respective transition slots compresses and/or stretches the resilient elements to enable movement of the bottom portion while the top portion remains static.

5. The chromatography valve according to claim 1, wherein the load varying mechanism comprises a biasing assembly operatively engaged with the rotor head, the biasing element assembly being operable to adjust the range of sealing load forces applicable to the rotor head.

6. The chromatography valve according to claim 5, wherein the biasing assembly comprises an outer biasing element operable to selectively adjust a maximum value of the range of sealing load forces.

7. The chromatography valve according to claim 6, wherein the outer biasing element comprises an outer stack of Belleville washers engaging the rotor head from below and an outer screw connector engaging the outer stack of Belleville washers and operable for applying a pressure thereon, and wherein operating the outer screw connector selectively adjusts the pressure applied to the outer stack of Belleville washers.

8. The chromatography valve according to claim 5, wherein the biasing assembly comprises an inner biasing element operable to selectively adjust a minimum value of the range of sealing load forces.

9. The chromatography valve according to claim 8, wherein the biasing assembly comprises an outer biasing element operable to selectively adjust a maximum value of the range of sealing load forces, and wherein the inner biasing element and the outer biasing element are independently operable relative to one another.

10. The chromatography valve according to claim 9, wherein the load varying mechanism further comprises a load variator provided within the internal chamber below the rotor head, the load variator and the rotor head being configured to cooperate to dynamically adjust the sealing load force applied to the rotor head during rotation thereof between the minimum value and the maximum value of the range of sealing load forces.

11. The chromatography valve according to claim 10, wherein the load variator comprises:
an annular plate having a groove defined therein;
a ball bearings slot provided in a bottom surface of the rotor head at least partially aligned with the groove of the annular plate; and
a ball bearing provided in the ball bearing slot and adapted to roll along the groove during rotation of the rotor, wherein one of the groove and the ball bearing slot has a sloped shape configured to enable the ball bearing to apply a varying load on the valve element by varying the compression forces applied to the rotor head based on the position of the ball bearing along the groove or the ball bearing slot.

12. The chromatography valve according to claim 8, wherein the inner biasing element comprises an inner stack of Belleville washers engaging the rotor head from below and an inner screw connector engaging the inner stack of Belleville washers and operable for applying a pressure thereon, and wherein operating the inner screw connector selectively adjusts the pressure applied to the inner stack of Belleville washers.

13. The chromatography valve according to claim 12, wherein the inner biasing element comprises a cylindrical thrust roller bearing provided between the inner stack of Belleville washers and the inner screw connector.

14. A chromatography valve for use in fluid analysis and chromatography applications, the chromatography valve comprising:
a valve cap provided with a plurality of process conduits extending therethrough, the valve cap having a cap interface, and each one of the process conduits comprising a process port opening on the cap interface;
a valve body engageable with the valve cap and having a body interface adapted to face the cap interface, the valve body comprising an internal chamber provided with an opening defined in the body interface;
a valve element provided in the opening of the valve body and adapted to engage the cap interface, each valve element comprising at least one channel adapted to establish fluid communication between a pair of process conduits to enable fluid flow through selected ones of the process conduits via the at least one channel; and
an actuation assembly provided within the internal chamber of the valve body, comprising:
a rotation mechanism operable to rotate the valve element between two or more operational positions for controlling fluid circulation between the process conduits; and
a load varying mechanism adapted to apply a first sealing load force on the valve element when in the operational positions, and a second sealing load force when rotating the valve element via the rotation mechanism, the load varying mechanism comprising a biasing assembly configured to selectively adjust the first sealing load force and the second sealing load force independently from one another.

15. The chromatography valve according to claim 14, wherein the biasing assembly comprises:
a first biasing element operable to selectively adjust the first sealing load force, corresponding to a minimum sealing load force, and a second biasing element operable to selectively adjust the second scaling load force corresponding to a maximum value of the sealing load force.

16. The chromatography valve according to claim 14, wherein the actuation assembly comprises a rotor head operatively connected to a rotor arm, the rotor head comprising:
   a top portion provided with a valve element receiving cavity shaped and sized to receive the valve element;
   a bottom portion configured to cooperate with the load varying mechanism; and
   a transition portion adapted to link the top portion to the bottom portion,
   the bottom portion being connected to the rotor arm, the bottom portion being adapted to at least partially rotate, over an angular displacement, independently with respect to the top portion to adjust the sealing load force without rotating the valve element.

17. The chromatography valve according to claim 16, wherein the load varying mechanism comprises:
   an annular plate provided below the rotor head and having a groove defined therein;
   a ball bearings slot provided in a bottom surface of the rotor head at least partially aligned with the groove of the annular plate; and
   a ball bearing provided in the ball bearing slot and adapted to roll along the groove during rotation of the rotor, wherein one of the groove and the ball bearing slot has a sloped shape configured to enable the ball bearing to apply a varying load on the valve element by varying the compression forces applied to the rotor head based on the position of the ball bearing along the groove or the ball bearing slot.

18. The chromatography valve according to claim 16, wherein the transition portion comprises alignment pins extending therethrough and engaging the top and bottom portions such that rotation of the bottom portion engages the top portion in rotation.

19. The chromatography valve according to claim 18, wherein the transition portion comprises transition slots shaped and sized to receive a corresponding one of the alignment pins, wherein the alignment pins are adapted to move along the transition slots during rotation of the bottom portion and of the top portion, and wherein the alignment pins are adapted to abut against an extremity of their respective transition slot to prevent further rotation of the top portion.

20. The chromatography valve according to claim 17, wherein the bottom portion comprises a driving mechanism configured to allow a greater range of motion to the bottom portion relative to the top portion such that the bottom portion is adapted to engage the load varying mechanism while the top portion remains static.

21. The chromatography valve according to claim 20, wherein the driving mechanism comprises resilient elements housed within the bottom portion, the alignment pins being adapted to engage the resilient elements, and wherein further rotation of the bottom portion when the alignment pins abut against the extremity of their respective transition slot compresses and/or stretches the resilient elements to enable movement of the bottom portion while the top portion remains static.

22. The chromatography valve according to claim 16, wherein the valve element includes a removable cartridge comprising the at least one channel, and wherein rotation of the removable cartridge is initiated via rotation of the top portion of the rotor head.

23. The chromatography valve according to claim 22, wherein the at least one channel is surrounded by an annular lip protruding from a top surface of the removable cartridge, the annular lip being adapted to engage the cap interface and surround the process port when in one of the operational positions.

24. The chromatography valve according to claim 23, wherein the cartridge comprises at least one purge channel radially extending on the cartridge interface.

* * * * *